(12) United States Patent
Chuang et al.

(10) Patent No.: US 12,229,589 B2
(45) Date of Patent: Feb. 18, 2025

(54) METHOD AND APPARATUS FOR SCHEDULING MATRIX OPERATIONS IN DIGITAL PROCESSING SYSTEMS

(71) Applicant: Expedera, Inc., Santa Clara, CA (US)

(72) Inventors: Shang-Tse Chuang, Lost Altos, CA (US); Sharad Vasantrao Chole, San Jose, CA (US); Siyad Chih-Hua Ma, Palo Alto, CA (US)

(73) Assignee: Expedera, Inc., Santa Clara, CA (US)

( * ) Notice: Subject to any disclaimer, the term of this patent is extended or adjusted under 35 U.S.C. 154(b) by 298 days.

(21) Appl. No.: 16/869,520

(22) Filed: May 7, 2020

(65) Prior Publication Data

US 2020/0371835 A1    Nov. 26, 2020

Related U.S. Application Data

(60) Provisional application No. 62/844,499, filed on May 7, 2019.

(51) Int. Cl.
| | |
|---|---|
| *G06F 9/48* | (2006.01) |
| *G06F 17/16* | (2006.01) |
| *G06N 3/00* | (2023.01) |
| *G06N 3/04* | (2023.01) |
| *G06N 3/08* | (2023.01) |
| *G06N 3/10* | (2006.01) |

(52) U.S. Cl.
CPC ............ *G06F 9/4881* (2013.01); *G06F 17/16* (2013.01); *G06N 3/04* (2013.01); *G06N 3/08* (2013.01); *G06N 3/10* (2013.01)

(58) Field of Classification Search
CPC ......... G06F 17/16; G06F 9/4881; G06N 3/04; G06N 3/063; G06N 3/08; G06N 3/084; G06N 3/10; Y02D 10/00
See application file for complete search history.

(56) References Cited

U.S. PATENT DOCUMENTS

| | | | | |
|---|---|---|---|---|
| 7,257,083 | B2 * | 8/2007 | Bansal | H04L 47/50 370/468 |
| 10,002,021 | B2 * | 6/2018 | Metz | G06F 9/461 |
| 11,042,370 | B2 * | 6/2021 | Maiyuran | G06F 9/3888 |
| 11,636,327 | B2 * | 4/2023 | Nurvitadhi | G06F 16/9024 706/15 |
| 2003/0208521 | A1 * | 11/2003 | Brenner | G06F 9/4881 718/103 |
| 2011/0289507 | A1 | 11/2011 | Khan et al. | |

(Continued)

*Primary Examiner* — Justin R Knapp
(74) *Attorney, Agent, or Firm* — Carr & Ferrell LLP

(57) ABSTRACT

Artificial intelligence is an increasingly important sector of the computer industry. However, artificial intelligence is an extremely computationally intensive field such that performing artificial intelligence calculations can be expensive, time consuming, and energy consuming. Fortunately, many of the calculations required for artificial intelligence applications can be performed in parallel such that specialized linear algebra matrix processors can greatly increase computational performance. But even with linear algebra matrix processors; performance can be limited due to complex data dependencies. Without proper coordination, linear algebra matrix processors may end up idle or spending large amounts of time moving data around. Thus, this document discloses methods for efficiently scheduling linear algebra matrix processors.

20 Claims, 22 Drawing Sheets

(56) References Cited

U.S. PATENT DOCUMENTS

| | | |
|---|---|---|
| 2013/0214838 A1 | 8/2013 | Shah et al. |
| 2014/0022263 A1 | 1/2014 | Hartog et al. |
| 2015/0058857 A1 | 2/2015 | Sandstrom |
| 2018/0032477 A1 | 2/2018 | Gholaminejad et al. |
| 2019/0287205 A1* | 9/2019 | Ramadoss ............. G06F 9/4881 |
| 2020/0043123 A1* | 2/2020 | Dash .................... G06F 9/3851 |
| 2020/0293368 A1* | 9/2020 | Andrei ...................... G06F 9/52 |

* cited by examiner

Inputs 521     4 Layers 522

| | Number of batches of data samples handled simultaneously 880 | |
|---|---|---|
| | Single batch of data samples | Multiple different batches of data samples |
| Only a single ANN model | SMSD Used by existing GPU & TPU accelerators. 810 | SMMD Minimize ANN memory requirements to maximize processor utilization. 850 |
| Multiple different ANN models | MMSD Able to provide low latency response for many different models. 870 | MMMD Able to work on many different models with many different batches. 860 |

Execution Paradigms

Number of ANN models handled simultaneously 890

Figure 8

| Layer | Phase | Priority S1 | S2 | S3 | S4 |
|---|---|---|---|---|---|
| Layer 0 | FP | 0 | 1 | 2 | 3 |
| Layer 1 | FP | 0 | 1 | 2 | 3 |
| Layer 2 | FP | 0 | 1 | 2 | 3 |
| Layer 3 | FP | 0 | 1 | 2 | 3 |
| Layer 3 | BP | 0 | 1 | 2 | 3 |
| Layer 3 | GU | 0 | 1 | 2 | 3 |
| Layer 2 | BP | 0 | 1 | 2 | 3 |
| Layer 2 | GU | 0 | 1 | 2 | 3 |
| Layer 1 | BP | 0 | 1 | 2 | 3 |
| Layer 1 | GU | 0 | 1 | 2 | 3 |
| Layer 0 | BP | 0 | 1 | 2 | 3 |
| Layer 0 | GU | 0 | 1 | 2 | 3 |

(Server 0; columns 1551 1552 1553 1554)

| Layer | Phase | Priority | | | |
|---|---|---|---|---|---|
| | | S1 | S2 | S3 | S4 |
| Layer 0 | FP | 0 | 0 | 0 | 0 |
| Layer 1 | FP | 1 | 1 | 1 | 1 |
| Layer 2 | FP | 2 | 2 | 2 | 2 |
| Layer 3 | FP | 3 | 3 | 3 | 3 |
| Layer 3 | BP | 4 | 4 | 4 | 4 |
| Layer 3 | GU | 5 | 5 | 5 | 5 |
| Layer 2 | BP | 6 | 6 | 6 | 6 |
| Layer 2 | GU | 7 | 7 | 7 | 7 |
| Layer 1 | BP | 8 | 8 | 8 | 8 |
| Layer 1 | GU | 9 | 9 | 9 | 9 |
| Layer 0 | BP | 10 | 10 | 10 | 10 |
| Layer 0 | GU | 11 | 11 | 11 | 11 |

(Server 0; columns 1651, 1652, 1653, 1654)

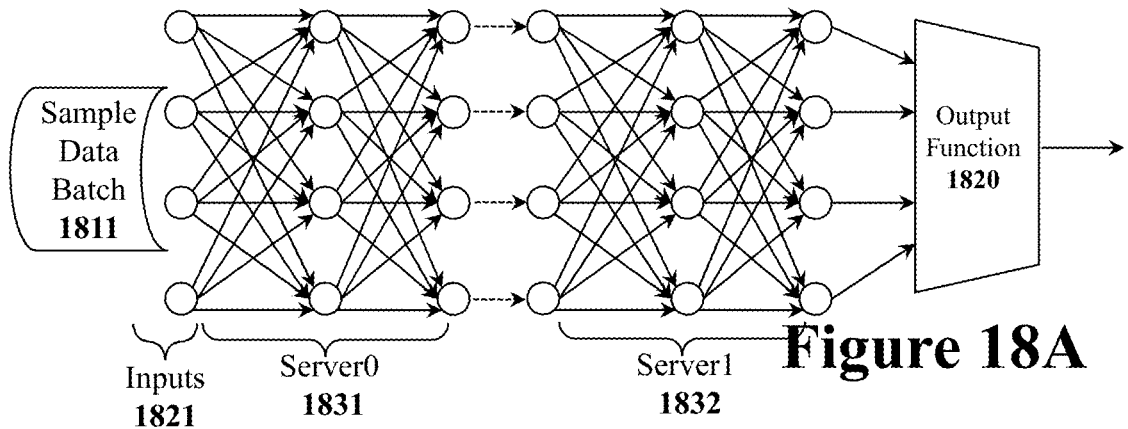

METHOD AND APPARATUS FOR SCHEDULING MATRIX OPERATIONS IN DIGITAL PROCESSING SYSTEMS

FIELD OF INVENTION

The present U.S. patent application claims the benefit of the previous U.S. Provisional Patent Application entitled "Method and Apparatus for Scheduling Matrix Operations in Digital Processing Systems" filed on May 7, 2019 having Ser. No. 62/844,499.

FIELD OF INVENTION

The present invention relates to the field of computer processing. In particular, but not by way of limitation, the present invention discloses digital circuit designs, methods, and control systems for scheduling matrix operations within digital processing circuits.

BACKGROUND

Early computer systems processed computer instructions a single instruction at time and were originally limited to running a computer program at a time. In order to share computer resources among many different computer programs, multitasking computer operating systems were developed. Multitasking computer operating systems interrupt an executing computer program, store the current state of that computer program, and then begin or resume the operation of another computer program such that the computer system can execute more than one computer program at time.

As computers further developed, computer systems were given multiple independent processing cores such that computer systems could execute multiple sets of instructions in parallel. Computer operating systems took advantages of this by allowing multiple independent computer programs to execute independently and in parallel. Furthermore, computer programs were developed that include different sections of code that can be run in parallel or single sections of code that can be duplicated and executed in parallel. This is known as multithreading.

Multitasking and multithreading are used in computer systems with multiple processing cores to maximize the processing throughput of conventional computer systems. This has been further expanded with massive parallel processing (MPP) computer systems that can use very large amounts of independent computer processors or computer systems to handle processing tasks that have a large amount of parallelism.

In recent years the field of Artificial Intelligence (AI) has grown to become very important. Artificial Intelligence is increasingly being used for a wide variety of tasks such as image recognition, High-Performance Computing (HPC), scientific computing, machine learning, data-mining, speech recognition, and self-driving vehicles. Artificial Intelligence applications tend to rely very heavily upon linear algebra matrix computations. Specifically, matrix operations are required to implement artificial neural networks (ANNs) that learn from a set of training data and then later apply that learning to new input data.

Artificial Intelligence (AI) applications have been traditionally implemented with conventional computer systems. Since there is a fair amount of inherent parallelism in Artificial Intelligence applications, various parallel computer systems such as multicore processors and massive parallel processing (MPP) computer systems have been used. However, Artificial Intelligence applications are specifically very dependent on linear algebra matrix computations. Although traditional computer CPUs can easily handle linear algebra matrix computations, they are not optimized for linear algebra matrix computations. Thus, improve efficiency and reduce the time required to perform complex linear algebra matrix computations, many specialized processors have been developed for handling specialized linear algebra matrix computations used within Artificial Intelligence (AI).

Due to the increased usage of artificial intelligence based applications, digital circuit designers have in recent years begun to develop specialized matrix processing circuits for the performing linear algebra matrix operations needed to implement an artificial neural network. Graphical Processing Units (GPUs) have long been used to perform linear algebra operations for three-dimensional graphics rendering. Thus, Graphical Processing Units (GPUs) have been modified to perform linear algebra operations for artificial neural networks.

Modified Graphical Processing Units (GPUs) have been very effective at efficiently and quickly performing the linear algebra matrix operations used into artificial neural networks. However, modified Graphical Processing Units (GPUs) generally used a long pipelined architecture that was originally developed to perform linear algebra operations for three-dimensional graphics rendering. Therefore, modified Graphical Processing Units (GPUs) work best when performing large batched operations of linear algebra operations for artificial neural networks.

Newer specialized digital processing circuits have been developed to specifically perform the linear algebra operations used within artificial neural networks. However, these newer artificial intelligence (AI) processors are still often underutilized due to various different reasons. For example, memory limitations, data dependencies, movement of vector data, reloading weight matrixes, and other tasks can significantly reduce the throughput of a specialized AI processor. Thus, without proper coordination, the specialized AI processor circuit may end up idle. Therefore, it is desirable to develop new scheduling methods for optimizing the computational efficiency specialized AI processor.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 8 illustrates a conceptual diagram describing the various different execution paradigms wherein the teachings of the present disclosure may be used.

FIG. 18A illustrates a four-layer artificial neural network split across two servers for a seventh example scheduling operation.

FIG. 18B illustrates a set of eight work queues for processing four data samples through the artificial neural network of FIG. 18A with two servers and recomputation.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although some of the example embodiments are disclosed with reference to a particular abstracted matrix processor, the techniques may be used with other implementations artificial intelligence digital processing circuits. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Neural Networks Overview

One of the core techniques in most artificial intelligence (AI) work is the use of artificial neural networks (ANNs). Artificial neural networks were originally designed based up the biological networks of neuron cells employed within animal brains. However, techniques used within artificial neural networks (ANNs) have improved over the years of research.

Like biological brains, artificial neural networks learn from the experience of input data from the world around them. For artificial neural networks, sets of training data are presented to the artificial neural network and the artificial neural networks attempts to make an inference. The results are compared with a desired answer to determine an error and that error is used to adjust as set of weights within the artificial neural networks to improve performance. This technique is known supervised learning.

Figure 1A:
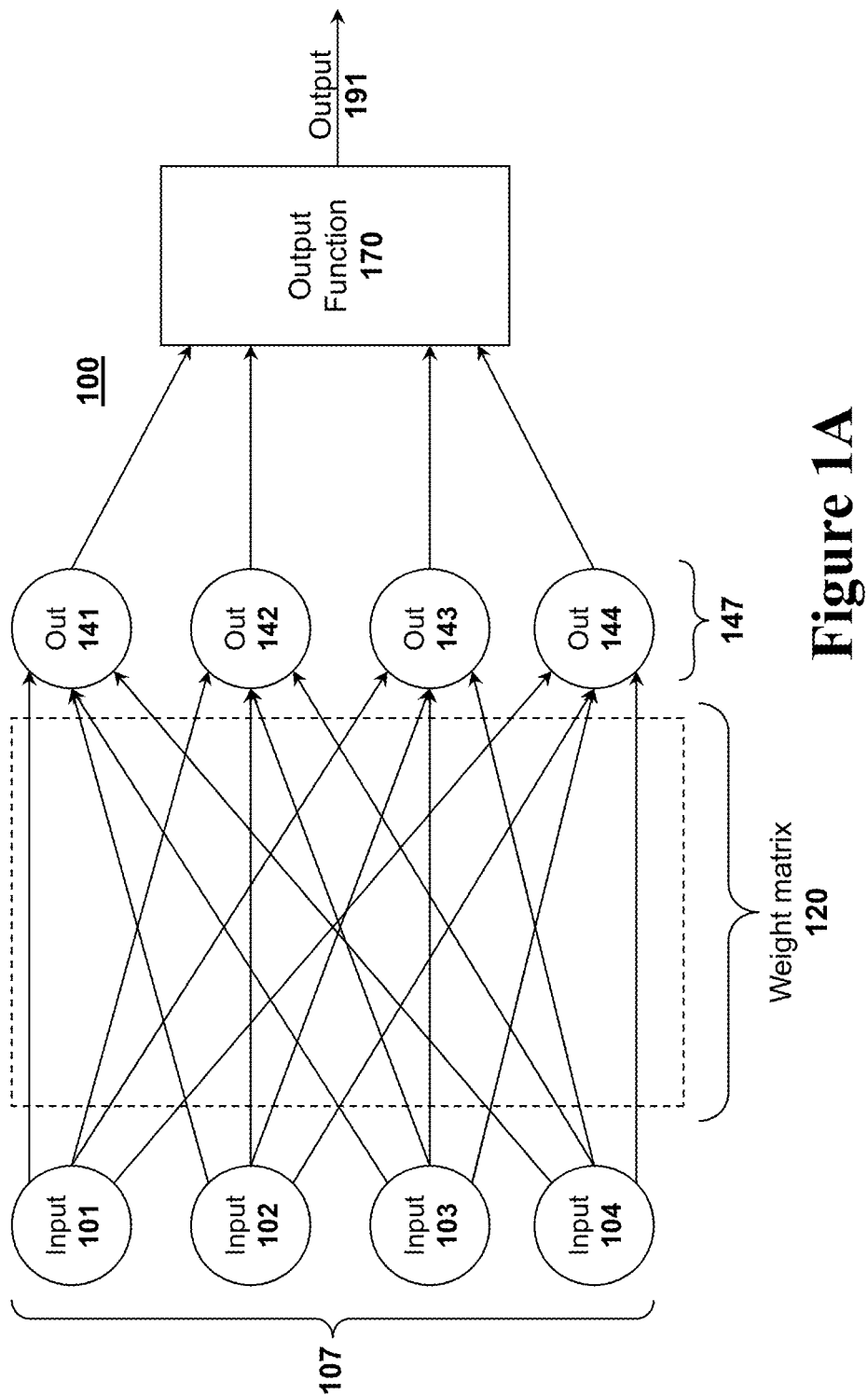
FIG. 1A illustrates a conceptual diagram of a single layer artificial neural network.

FIG. 1A illustrates a conceptual diagram of a single-layer four-input artificial neural network (ANN) 100. Referring to the artificial neural network (ANN) of FIG. 1A, input data values 101 to 104 form an input data vector 107 that is provided with training data vectors during training sessions and then with new input data vectors when the artificial neural network is later used to make inferences. The input data vector 107 is processed with a weighted matrix 120 to create an output data vector 147 (output data values 141 to 144). Many different types of data processing may be performed using weighted matrix 120 (such as a Hadamard product, Frobenius inner product, matrix addition, etc.) however this document will focus upon the well-known matrix product. (Note that the techniques described in this document can be used with any of these other data processing operations.)

After processing the input data vector 107 (input data values 101 to 104) with the weighted matrix 120 to create the output data vector 147 (output data values 141 to 144), the output data vector 147 may be combined with an output function 170 to create a final output 191 for the artificial neural network 100. The output function 170 may be referred to as an activation function.

Note that the four-input artificial neural network of FIG. 1A illustrates just one example of very small an artificial neural network. Artificial neural networks may be constructed much wider than just four inputs. Multiple independent artificial neural networks may be used in parallel and the outputs of the independent artificial neural networks may be combined.

Figure 1B:
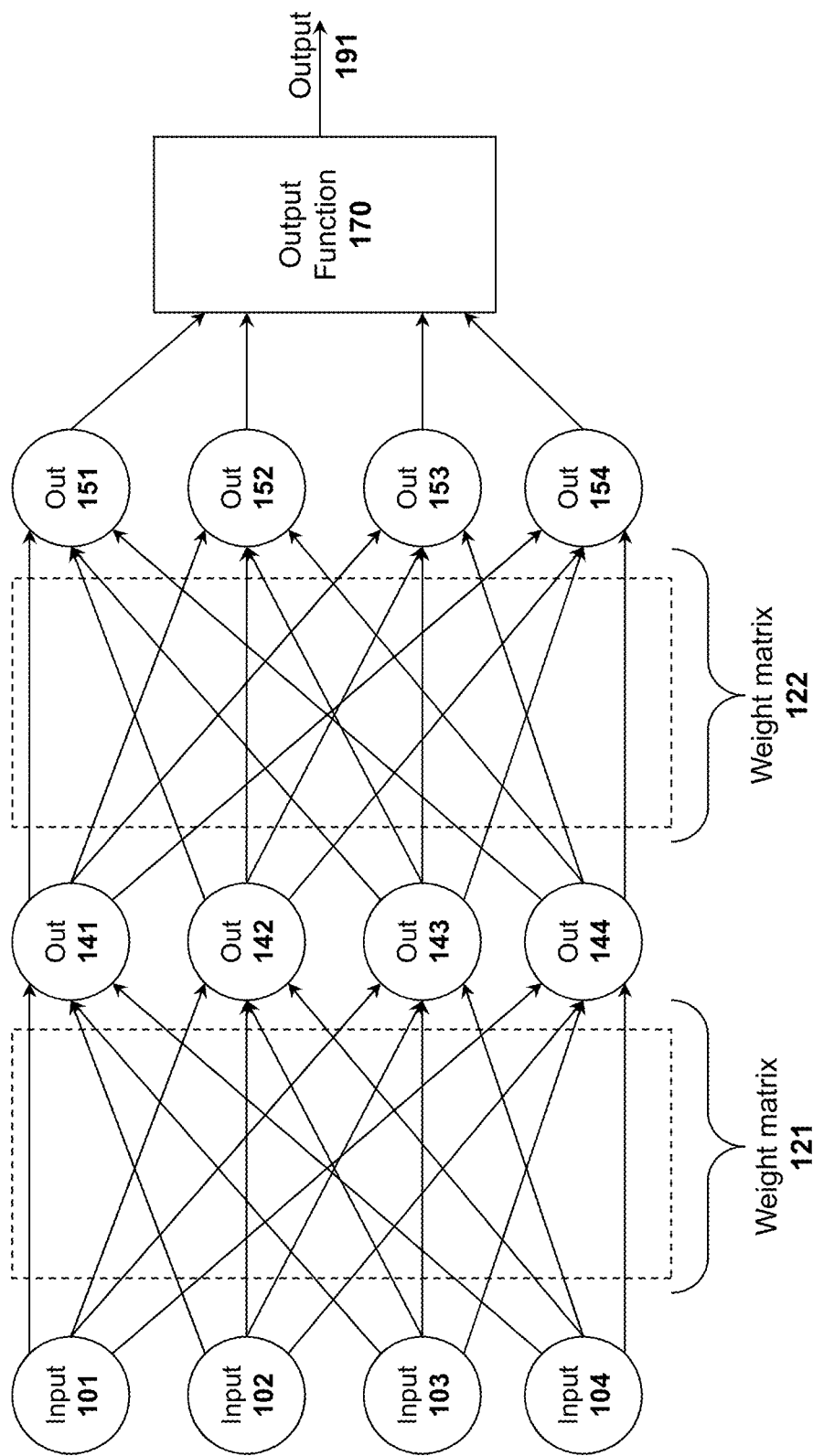
FIG. 1B illustrates a conceptual diagram of a double-layer artificial neural network.

Artificial neural networks may comprise many layers of weight matrices such that very complex analysis of the input data may be performed. For example, FIG. 1B illustrates a two-layer artificial neural network wherein the input data values (101 to 104) is processed with a first weighted matrix 121 to create intermediate output data values (141 to 144). Next, intermediate output data values (141 to 144) is processed with a second weighted matrix 122 to create output data values (151 to 154). Output data values (151 to 154) may be processed by output function 170 to create a final output. Alternatively (or in addition to), the output data values (151 to 154) may also be used as intermediate data that is fed into additional artificial neural network layers (not shown) such that very complex hierarchical artificial neural networks may be created.

Abstracted Matrix Processor

As set forth in background, the field of artificial intelligence has become increasingly popular. Therefore, there are now many dedicated artificial intelligence digital processing circuits designed to accelerate the task of performing the linear algebra matrix operations that are performed heavily within artificial neural network applications.

Figure 2:
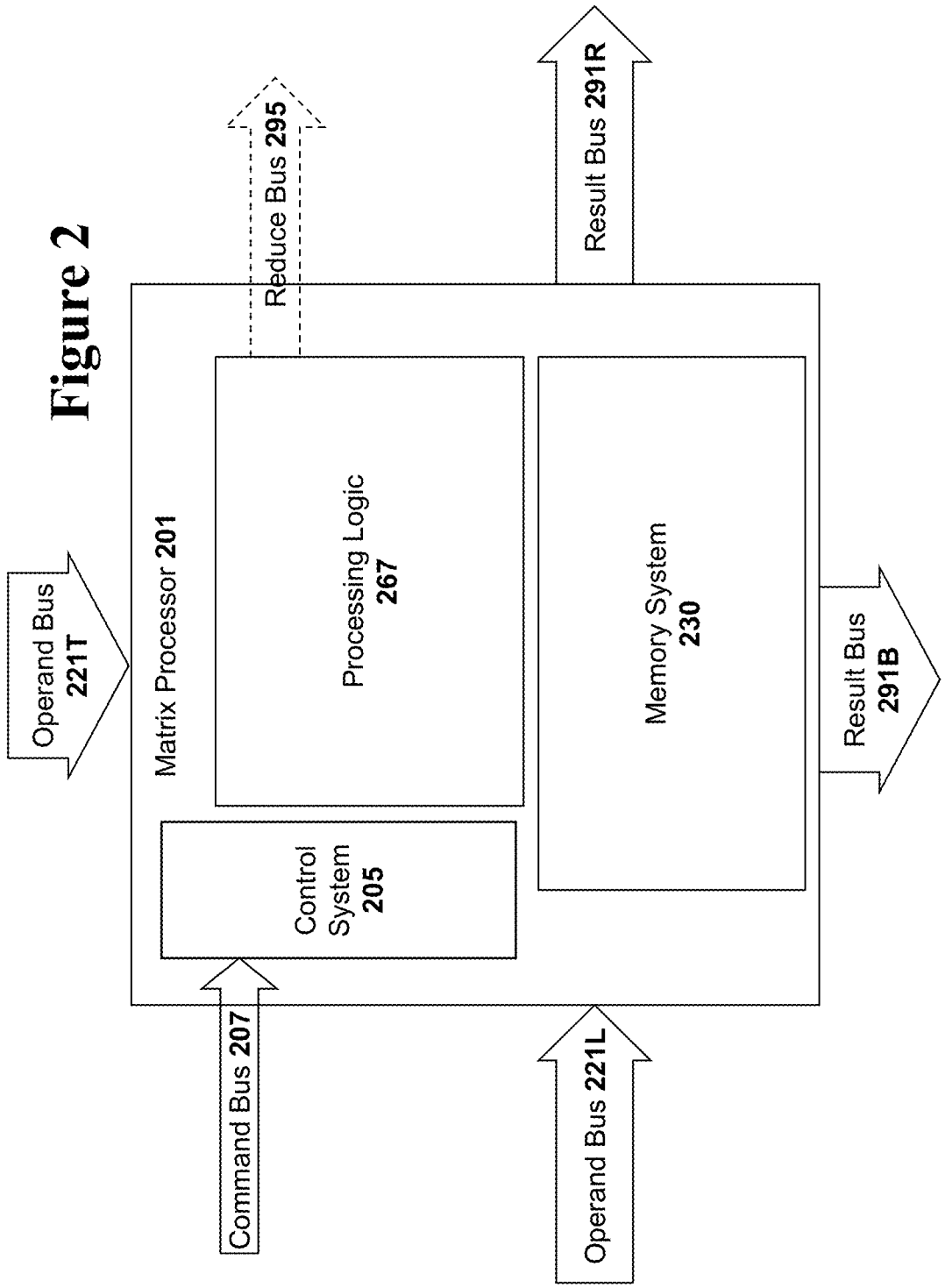
FIG. 2 illustrates a block diagram of an abstracted Matrix Processor that may be used to perform matrix calculations.

FIG. 2 illustrates a block diagram of an abstracted matrix processor 201 that has been designed to perform linear algebra matrix operations for artificial neural network applications. Matrix processors can be implemented in many different sizes and in many different manners. This document is primarily concerned with scheduling linear algebra matrix operations for processing by such matrix processors and thus will not discuss matrix processor hardware in detail. However, to provide an example of what a matrix processor may entail, an example of an abstracted matrix processor will be described.

Referring to FIG. 2, the abstracted matrix processor 201 receives input data on one or more operand buses. In the particular matrix processor embodiment of FIG. 2, there are two operand buses: operand bus from the top 221T and operand bus 221L from the left. Data received on the operand buses may be used directly by the processing logic 267 or may be stored in a local memory system 230 for later usage. The data received may comprise entire weight matrices and input data operand vectors. The memory system 230 may also include register files closely coupled to the processing logic 267.

The matrix processor 201 also receives commands on command bus 207. The control system 205 within the matrix processor 201 parses the commands received and uses the received commands to determine how the processing logic 267 should be used to process data. The processing logic 267 may be implemented in many different manners as long as the matrix processor 201 performs the desired linear algebra matrix operations and outputs the proper linear algebra matrix operation results. For example, the processing logic 267 may be implemented with a single-instruction multiple-data (SIMD) processor, a digital signal processor (DSP), a conventional central processing unit (CPU) core, a highly parallelized custom matrix processor, or in any other manner that performs the desired linear algebra matrix operations.

The matrix processor 201 may be designed to operate using many different types of data formats and data precision levels. For example, the Matrix Processor 201 may process integers, 16-bit floating point numbers, 32-bit floating point numbers, or any other data format.

Many different matrix operations may be implemented in the abstracted matrix processor 201. Two well-known matrix operations that may be included are the matrix dot product and the matrix cross products.

The control system 205 of the matrix processor 201 instructs the processing logic 267 to output the results of requested matrix operations on one or more result bus 291. In some embodiments, the matrix processor 201 will include the reduction logic output a reduced form of the result on a reduce bus 295.

The operand buses may be wide parallel buses such that entire input data vectors can be loaded into the matrix processor 201 during a single operating cycle. Similarly, entire weight matrix rows from a neural network weight matrix may be read into the matrix processor 201 during a single operating cycle. Similarly, the result buses 291 are also wide parallel buses such that entire output data vectors can be output during a single operation cycle.

The memory system 230 is generally a very important component of the abstracted matrix processor 201. To optimize performance, the memory system 230 of the matrix processor 201 may be constructed wide and deep. The memory system 230 is an important resource of the matrix processor and must be carefully used in order to optimize operation. Thus, a scheduling system must carefully consider the limitations of the memory system 230 within matrix processors to ensure that it is used efficiently without overflowing.

The memory system 230 is wide in that entire data vectors can be written into or read out of the memory system 230 during a single operating cycle. For example, in Matrix Processor that handles a 16 by 16 element matrix wherein each element is a 16-bit floating-point value, the memory system can read out 256 bit values such that an entire sixteen element data vector comprising 16-bit data values each can be read out of the memory system 230 during a single operating single cycle.

In one particular matrix processor, the memory system 230 is deep in that it is constructed large enough to store multiple different sets of weight matrices. In this manner the matrix processor 201 can be used to perform matrix operations on multiple different artificial neural network layers. For example, if a matrix processor 201 cannot perform an operation for one particular neural network layer because a required input data vector is not yet available, that matrix processor can instead be used to perform matrix operations for other neural network layers or other neural networks. A deep memory system 230 allows the matrix processor 201 to be used very efficiently since it can handle a steady stream of requested matrix operations for many different neural networks without ever needing to load in weight matrix data, one of the most time consuming (and energy consuming) tasks for matrix processing.

In addition to storing multiple weight matrices, the memory system 230 can be used to store other information that may be needed such as input data vectors, output data vectors, error vectors, etc. Intermediate result data vectors from forward pass operations may be stored in the memory system 230 and then later accessed when performing a related back propagation operation. Another very important type of data that may be stored is matrix weight gradients. A matrix weight gradient comprises a matrix of adjustments for a weight matrix that may be periodically used to update the weight matrix.

Matrix Processor Array

The abstracted matrix processor 201 illustrated in FIG. 2 may be used alone to perform simple linear matrix operations very quickly. For example, the Matrix Processor 201 can be used to implement the very small artificial neural network 100 illustrated in FIG. 1A. It could also be used to implement the small two-layer artificial neural network illustrated in FIG. 1B by using it serially to perform the required matrix operations of both artificial neural network layers.

However, most artificial neural networks must handle many more inputs and outputs than the very small example artificial neural networks illustrated in FIGS. 1A and 1B. It is therefore desirable to combine together the computing ability of many different matrix processors in order process wider artificial neural networks and multi-layer artificial neural networks. In this manner, much larger multi-layer artificial neural networks that are used to perform useful artificial intelligence tasks can be handled very efficiently.

Figure 3A:
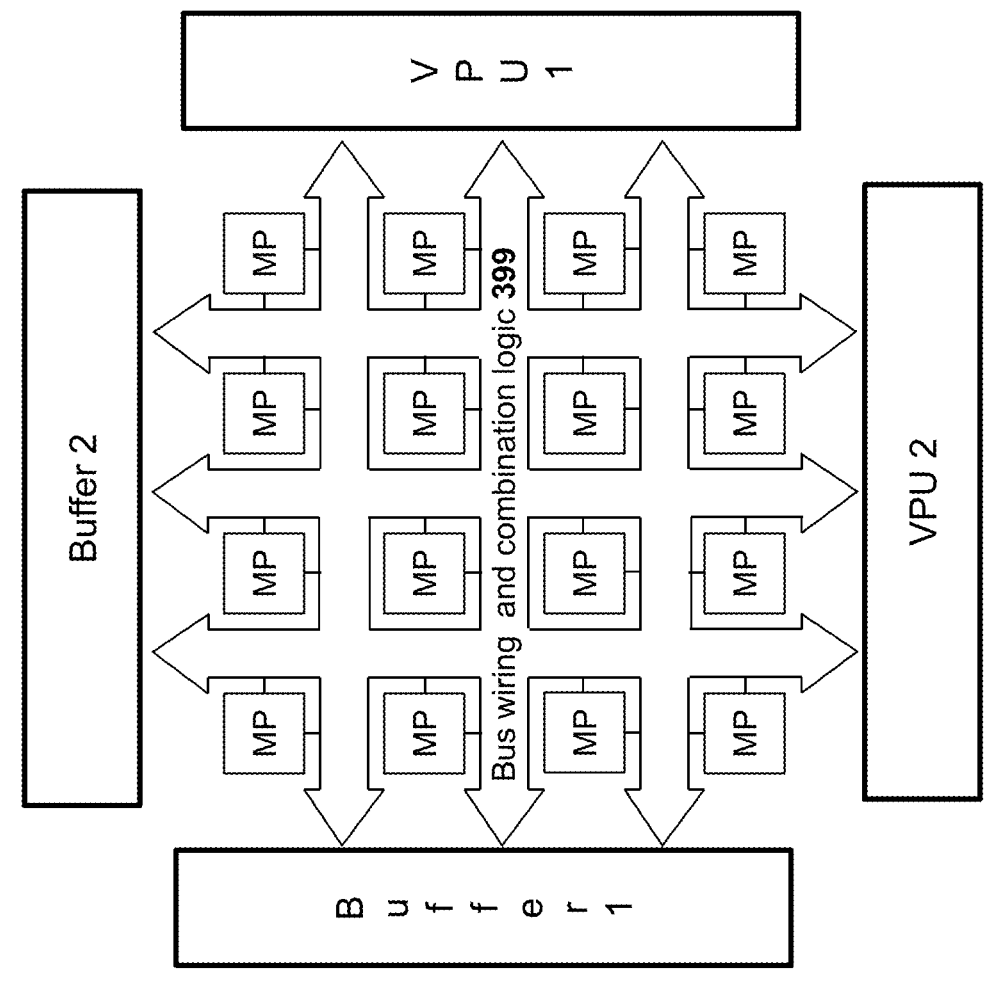
FIG. 3A illustrates a block diagram of an array of Matrix Processors surrounded by buffers on two sides and vector processors on two sides.

FIG. 3A illustrates a block diagram of an architecture using multiple matrix processor circuits in a coordinated manner to implement wide multi-layer artificial neural networks. In FIG. 3A, each individual matrix processor is labelled as "MP" for Matrix Processor. As illustrated in FIG. 3A, the matrix processors are arranged in a grid array format. In between the individual matrix processors of the matrix processor array is bus wiring and combination logic 399 that couples all of the matrix processors to buffers that provide input data and vector processing units (VPU) that receive result data vectors and further process those result data vectors. The bus wiring and combination logic 399 may be implemented in different manners to achieve different goals.

Figure 3B:
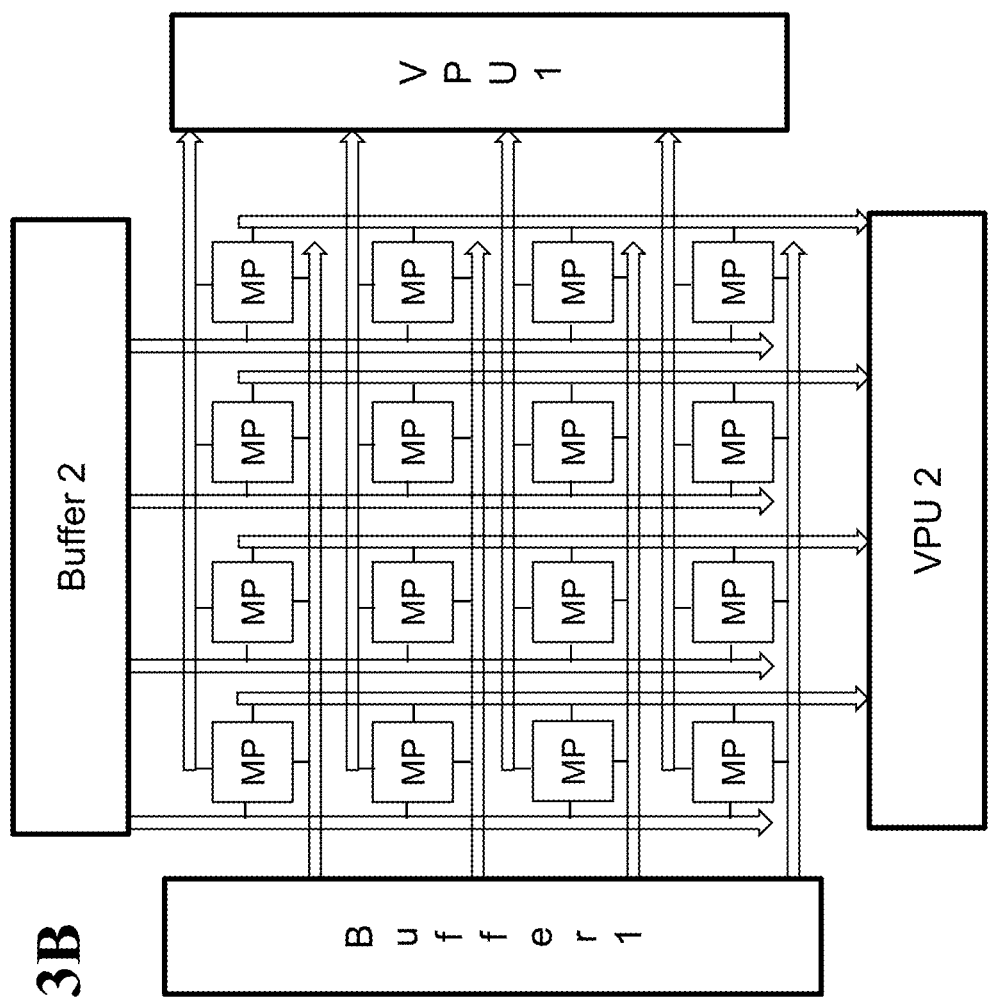
FIG. 3B illustrates one embodiment of the matrix processor array of FIG. 3A.

To provide data vectors to the array of matrix processors in one embodiment, Buffer 1 on left and Buffer 2 on the top are coupled to the operand bus of every individual Matrix Processor in the bus wiring and combination logic 399. This may be accomplished by coupling operand bus to Buffer 1 and operand bus to Buffer 2 as illustrated in FIG. 3B. In this manner, data vectors from either Buffer 1 or Buffer 2 can be loaded into the Matrix Processors in the array. The data vectors may comprise weight matrix rows, input data vectors, or any other required data. Note that since there are multiple buses, the operand loading operations can be performed in parallel.

Similarly, the result bus of every matrix processor in the array is coupled to Vector Processing Unit 1 (VPU1) on the right and Vector Processing Unit 2 (VPU2) on the bottom of the array using bus wiring and combination logic 399. This may be accomplished by coupling result bus to Vector Processing Unit 1 (VPU1) on the right and result bus to Vector Processing Unit 2 (VPU2) on the bottom as illustrated in FIG. 3B. The Vector Processing Units contain both storage for storing result data vectors and processing logic for performing various vector processing operations on received result data vectors. For example, the Vector Processing Units (VPUs) can combine partial result data vectors from multiple different Matrix Processors into a single complete output data vector result.

All of the individual Matrix processors in the array receive commands on their individual command buses (not shown in FIG. 3B). In this manner, each individual Matrix Processor in the array can be controlled individually. For example, the individual Matrix Processors can be informed when data is available on their operand buses and what operations to perform. By carefully controlling each individual matrix processor of the array in a coordinated manner, the matrix processor array becomes a very powerful system for efficiently processing matrix operations needed for artificial intelligence applications.

Artificial Neural Network Processing

Figure 4A:
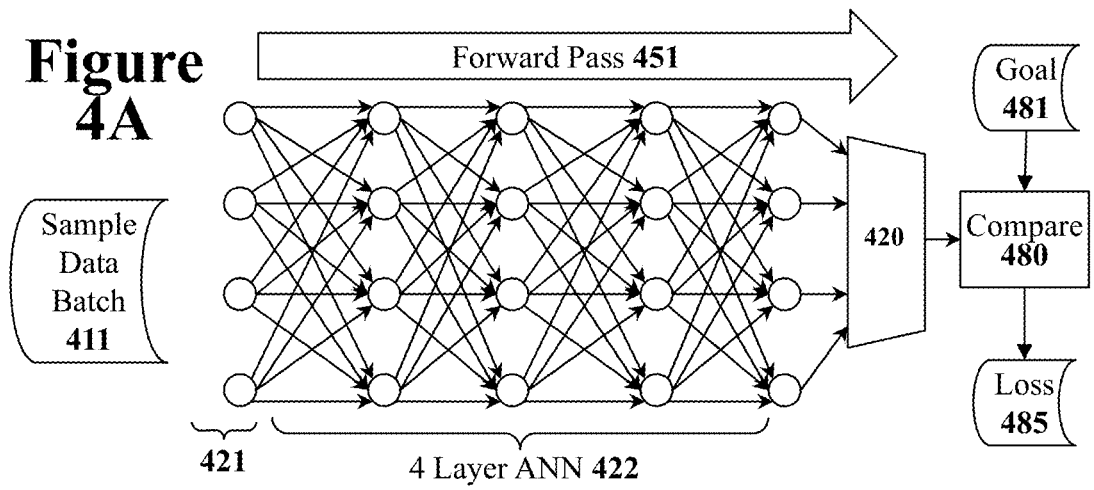
FIG. 4A conceptually illustrates a forward pass inference operation through a four layer artificial neural network.
Figure 4B:
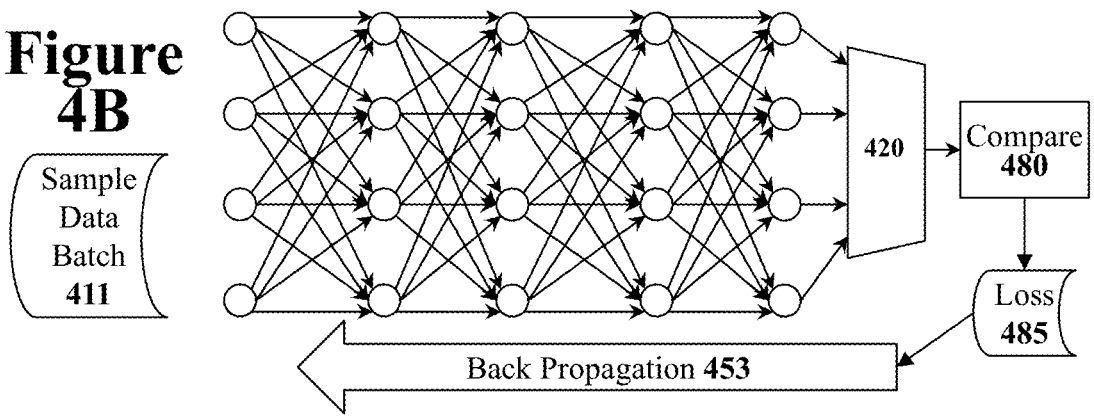
FIG. 4B conceptually illustrates a back propagation operation through a four layer artificial neural network.
Figure 4C:
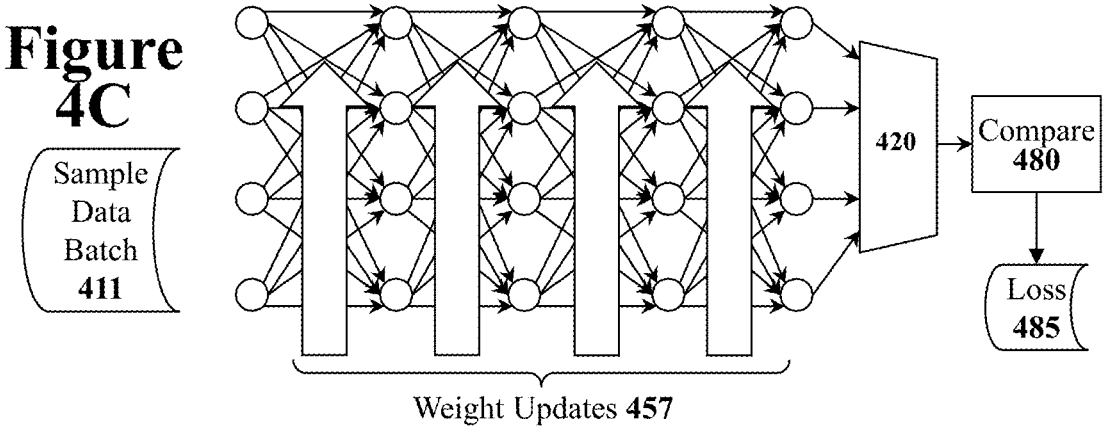
FIG. 4C conceptually illustrates a weight update operation through a four layer artificial neural network.

Artificial neural networks (ANNs) generally perform training in a three step process: a forward pass inference, a backward pass loss error detection, and weight matrix updates. FIGS. 4A to 4C illustrate these common three artificial neural network processing stages.

FIG. 4A conceptually illustrates a forward pass inference operation 451 through a four layer artificial neural network (ANN) 422. A batch of sample data vectors 411 is used to provide an input data vector 421 to the 4 layer ANN 422. The data vector is processed through the four layers of the 4 layer ANN 422 producing intermediate results after each layer. During training, these intermediate results need to be stored for later usage but during inference-only operation they can be discarded. At the end of the 4 layer ANN 422 the final results can be combined with an activation function 420 to create a final output value that may be used as an inference.

When in supervised training mode, that final output value is compared with a goal value 481 at comparison 480 to calculate a loss value 485. This loss value represents a difference between a desired outcome and the inference made by the 4 layer ANN 422.

During supervised training, there are two more sets of calculations used to improve the learning of the 4 layer ANN 422: back propagation and weight updates. FIG. 4B conceptually illustrates the back propagation operation 453. Using the loss value 485, the back propagation successively goes back down through the layers using the intermediate results stored to calculate an error vector for every layer in the 4 layer ANN 422. This error vector is then stored or immediately used to perform a weight update as will be described next.

After a back propagation, a weight update operation 457 may be performed as illustrated in the conceptual diagram FIG. 4C. The weight update operation uses the intermediate data from the forward pass inference operation 451 and the error vectors calculated during the back propagation operation 453 to calculate weight gradients that will be used to update the weight matrices in the 4 layer ANN 422. Note that the gradient values may be combined and stored and only periodically used to update the actual weights in the weight matrices.

Artificial Neural Network Batch Processing

Figure 5A:
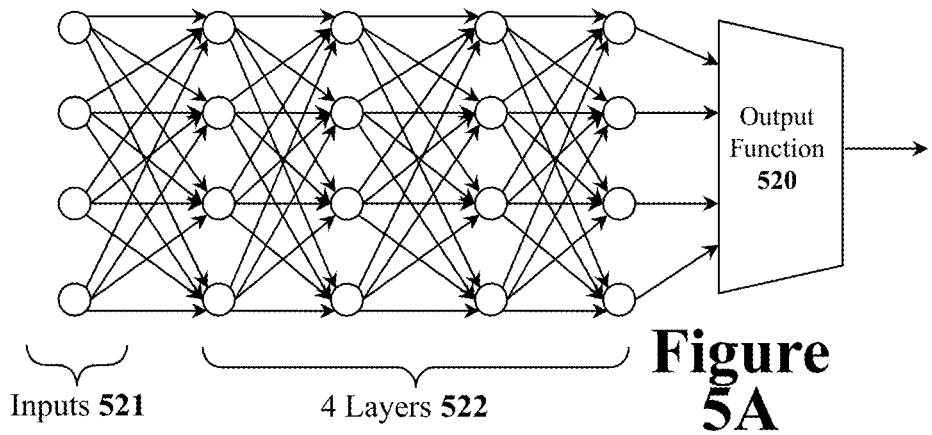
FIG. 5A illustrates a four layer artificial neural network.
Figure 5B:
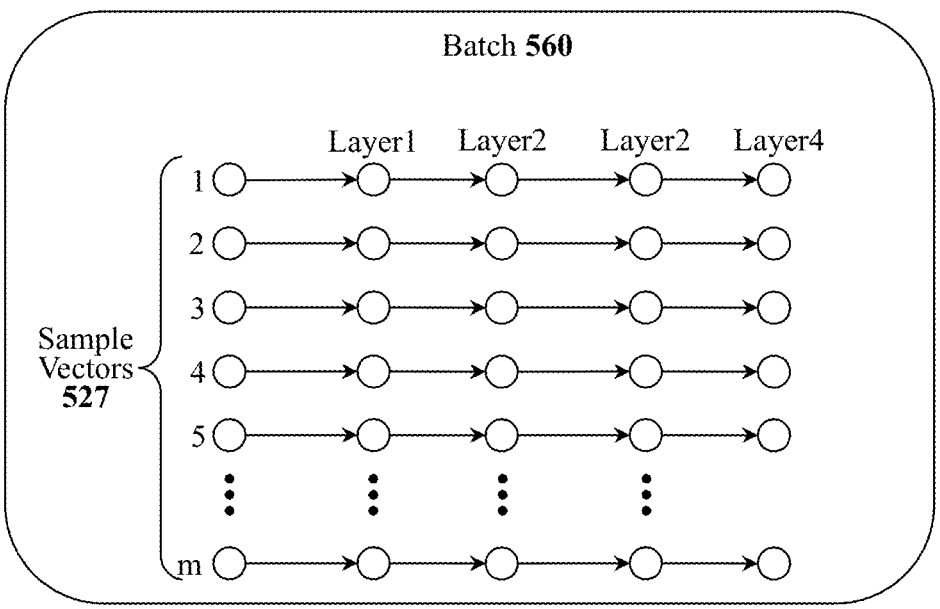
FIG. 5B illustrates a batch of sample data vectors and the operations that must be performed for an inference operation of the sample data vectors.

To efficiently process large amounts of training data, the training sample data vectors are organized into batches for processing through artificial neural networks (ANNs). For example, FIG. 5A illustrates the same four layer artificial neural network (ANN) 522 of FIGS. 4A to 4C. FIG. 5B illustrates a batch of operations 560 that must be performed for an inference operation of the sample data vectors 527 (the first column).

The batch of operations 560 have certain data dependencies. For just an inference operation, the data dependencies are relatively simple: each data sample must be processed through every layer of the 4 layer ANN 522. This dependency is illustrated by the arrows connecting the successive operations of a data sample through all four layers. Each of the different sample data vectors is independent of each other such that there are no data dependencies between different sample vectors (and thus no arrow between them).

Figure 6A:
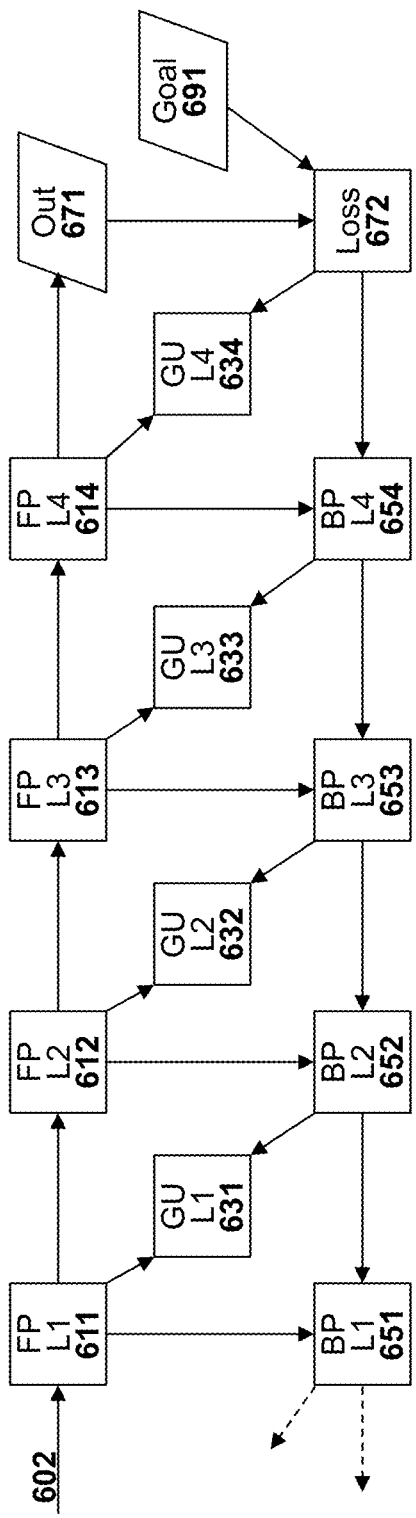
FIG. 6A illustrates the full data dependencies for all the three common artificial neural network processing stages for a four-layer artificial neural network.
Figure 6B:
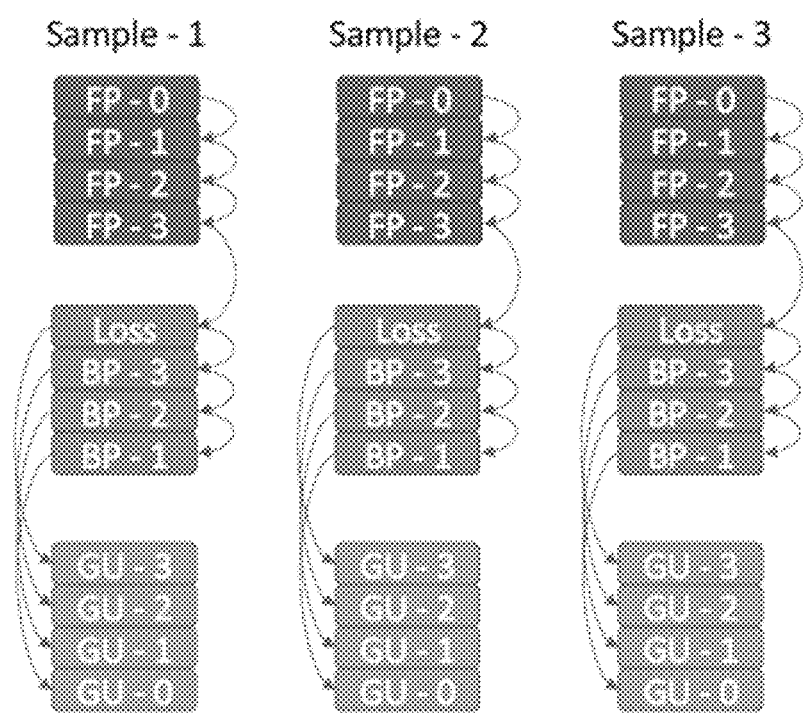
FIG. 6B illustrates three work queues that are ordered according to the data dependencies for all the three common artificial neural network processing stages for a four-layer artificial neural network.

The full data dependencies for all three sets of artificial neural network processing stages (forward pass, back propagation, and gradient update) is quite a bit more complex. FIGS. 6A and 6B illustrate the full data dependencies for all the three common artificial neural network processing stages. Referring to FIG. 6A, an input vector of sample data 602 enters at the upper left. That sample data is then used to perform forward processing (FP) operations 611, 612, 613, and 614 to create output value 671. Note that each of those stages creates intermediate data that is stored for later use.

The output value 671 is compared with a goal value 691 to calculate a loss value 672 that indicates how far the inference was from a desired goal value. That loss value 672 is then used for a series back propagation operations. Specifically, loss value 672 is combined with the intermediate data from layer 4 forward pass in a back propagation (BP) 654 for layer 4. The output from back propagation (BP) 654 is combined with the intermediate data from layer 3 forward pass operation 613 in a back propagation (BP) operation 653 for layer 3. And so on all the way back to the layer 1 back propagation operation 651.

The outputs from the loss value 672 and the successive back propagation operations (654, 653, and 652) may then be used to for gradient update (GU) operations (631, 632, 633, and 634). The GU operations (631, 632, 633, and 634) require the data calculated from both the forward pass operations and the back propagation operations for a layer.

In the data dependency diagram of FIG. 6A, a processing operation requires all of the data from the arrows going into that processing operation to be available before that processing operation can be performed. Thus, all of the forward pass operations 611, 612, 613, and 614 must be performed in that order before any other operations. But after that, some operations can be done in different order. For example, after back propagation operation 654 has been performed then the next operation can be gradient update operation 633 or the next back propagation operation 653.

FIG. 6B illustrates an alternate illustration of the data dependencies. Specifically, FIG. 6B illustrates three assembled work queues for three data samples to be processed through a four-layer artificial neural network. In FIG. 6B each work queue comprises a set of computational operations that need to be performed in order. Furthermore, the data from the arrows going into each computational operation need to be available before that computational operation can be performed.

Simple Batch Scheduling

In a relatively simple environment with one artificial neural network model, one batch of training vectors, and one matrix processor for processing the batch of training vectors; it may seem relatively simple to schedule the processing of the one batch of training vectors. However, even in such a simple environment, the task is not as simple as it seems.

Referring back to FIG. 5B, there is a batch of sample data vectors 527 to be processed with the 4 layer artificial neural network of FIG. 5A. The data vectors may be processed through the 4 layer ANN 522 in any order as long as the data dependencies of FIGS. 6A and 6B are handled properly.

Figure 7A:
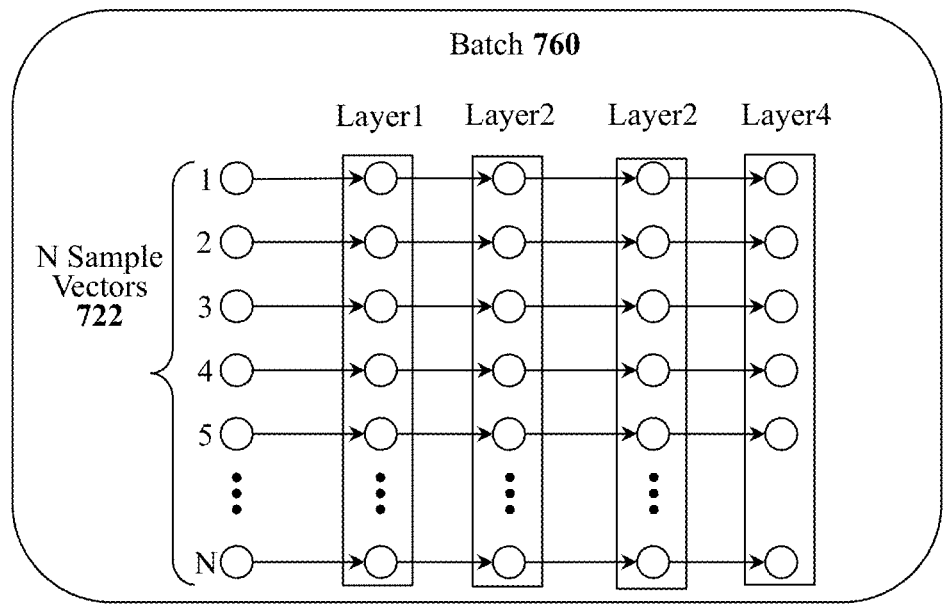
FIG. 7A illustrates a "layer-first" scheduling system for processing the data samples through the four-layer artificial neural network of FIG. 5A.
Figure 7B:
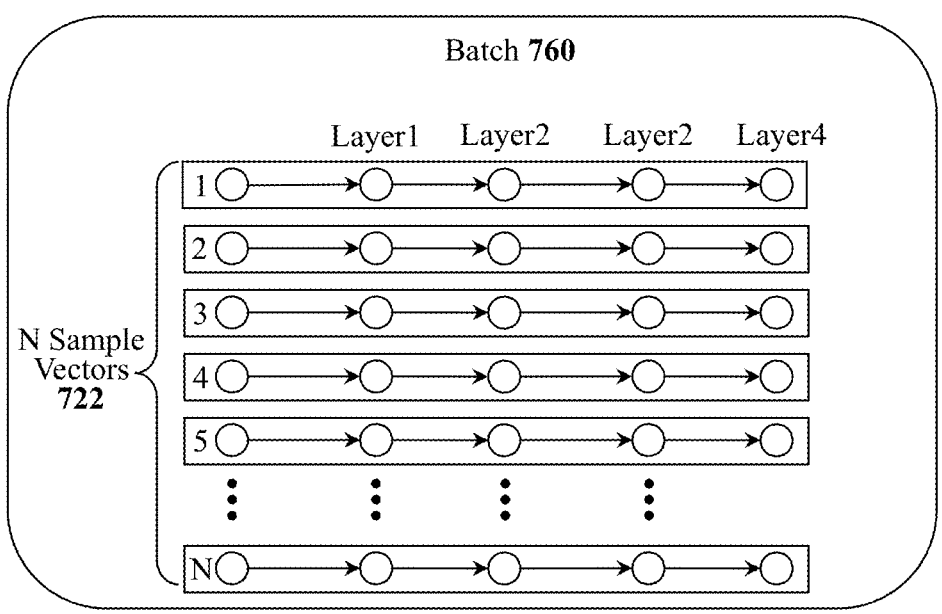
FIG. 7B illustrates a "sample-first" scheduling system for processing the data samples through the four-layer artificial neural network of FIG. 5A.

FIGS. 7A and 7B illustrates two different extremes on how the various sample data vectors 527 in FIG. 5B may be scheduled for processing through the 4 layer artificial neural network of FIG. 5A. FIG. 7A illustrates a "layer-first" scheduling system and FIG. 7B illustrates a "sample-first" scheduling system.

Referring to the "layer-first" scheduling system of FIG. 7A, all of the data vector samples are first processed through the first layer of the artificial neural network of FIG. 5A. Next, the results from that first layer processing are then first processed through the second layer of the artificial neural network of FIG. 5A. And so on until all the data vectors have been forward pass processed through the entire artificial neural network of FIG. 5A. Next, the system may then sequentially perform back propagation operations back down through all the layers artificial neural network of FIG. 5A.

The layer-first scheduling system may provide the one way to obtain a relatively low latency on the inference operation (the forward pass operations) and the back propagation and weight updates are then performed later. However, the layer-first scheduling will generate large amounts of intermediate results that must be stored for a long time. This will generally require off-chip storage thus requiring off-chip memory bandwidth. The time spent moving data off chip will reduce utilization and increase latency. Furthermore, the all of the data movement will reduce the power efficiency of the processing such energy must be spend moving all the data on and off chip.

FIG. 7B illustrates the other extreme of scheduling, a "sample-first" scheduling system. In the sample-first scheduling system, each individual sample is process through all the layers artificial neural network of FIG. 5A. For example, the first sample data vector is forward pass processed through all four layers of the artificial neural network of FIG. 5A to obtain an inference result. If this is training, the system may then perform back propagation back down through all the layers of the artificial neural network and weight gradient updates may then be calculated. (If this is just for inference, the system may immediately move to process the second data vector after completing the forward pass of the first data vector.)

Since only intermediate results from one data vector need to be stored, the results from the processing can be stored locally. This reduces the power consumption of the processing. However, there are several downsides of the sample-first scheduling system. For example, there is significant latency before the last data sample will be handled. Furthermore, there will be low utilization due to the data dependencies, the hardware latency, and the data flow delay.

Between the two extremes of the "layer-first" scheduling system of FIG. 7A and the "sample-first" scheduling system of FIG. 7B are many different scheduling systems. For example, small sub-batches of three data sample vectors may be processed through the entire four layer artificial neural network at time. Alternatively, batches 760 of sample data vectors 722 may be sequentially processed through their forward pass operations until the memory starts becoming filled and then back propagations and weight updates may then begin to clear out the memory. Thus, the task of scheduling a single batch of sample data vectors through a single artificial network can be quite complex.

The data vector scheduling described with reference to FIGS. 5A, 5B, 7A, and 7B can be made even more complex by having multiple different matrix processors that processing can be dispatched to. Copies of the artificial neural network can be provided to multiple matrix processors such that data samples can be processed in parallel. Note that intermediate that will be stored in the different matrix processors will complicate the data dependencies such that operations that require that intermediate data can only be dispatched to the matrix processors requiring that intermediate data.

Scheduling in Complex Environments

The simple environment of a single artificial neural network (ANN) and a single batch of operations 560 that must be executed by artificial neural network as depicted in FIG. 5A and FIG. 5B illustrates the current situation for many artificial neural network processors. However, much more complex situations can arise when handling multiple different artificial neural networks and multiple different sets of data batches to be processed.

FIG. 8 illustrates a conceptual diagram describing the various different execution paradigms wherein the teachings of the present disclosure may be used. The different paradigms may handle only a single artificial neural network or multiple different artificial neural networks along a first axis 890. Furthermore, the different execution paradigms may handle only a single batch of data samples simultaneously or handle multiple different batches of data samples simultaneously along a second axis 880. Each of the different execution paradigms will be described individually.

The first execution paradigm is the current paradigm 810 upper left quadrant. This paradigm is the current paradigm of a single artificial neural network model (Single Model=SM) that handles a single batch of data samples (Single Data=SD) processed with a single artificial neural network model. This is essentially the example previously described with reference to the single artificial neural network of FIG. 5A and the single batch of sample data vectors 527 of FIG. 5B. This is how existing Graphics Processor Unit (GPU) and Tensor Processing Unit (TPU) based artificial intelligence processors operate. As described with reference to FIG. 7A and FIG. 7B even the data sample scheduling for the simplest case of FIG. 8 can be quite complex. In addition to the Single Model Single Data (SMSD) paradigm 810, FIG. 8 illustrates three other operating paradigms that the scheduling techniques of this disclosure can also be used to handle.

In the upper right quadrant is a Single Model Multiple Data (SMMD) paradigm 850 that handles a single artificial neural network (ANN) model but multiple different batches of data samples. By only handling a single artificial neural network (ANN) model, only one set of ANN weight matrices needs to be handled and thus minimizes memory requirements. And by handling multiple different data sample batches, there are multiple different sets of data samples that can be executed such that data dependencies will rarely slow execution and there will rarely be time without data to process. In this manner this SMMD execution paradigm can achieve high utilization. If some data needs to be moved on or off chip for one set of data samples then computation can be performed on another set of data samples.

The lower-left quadrant contains Multiple Model Single Data (MMSD) operation paradigm 870. The MMSD operation paradigm 870 can handle multiple different artificial neural network (ANN) models but limits execution to a single batch of data samples. By only processing a single batch of data samples, the system may quickly complete the computations for the single batch of data samples as fast as possible without interruption from any other data samples thereby achieving low latency response times. The MMSD operation paradigm 870 is good for performing real-time inferences in order to return results as fast as possible.

Finally, the bottom-right quadrant specifies a Multiple Model Multiple Data (MMMD) operation paradigm 860. The MMMD operation paradigm 860 handles both multiple different artificial neural network (ANN) models and multiple different batches of data samples simultaneously. This MMMD operation paradigm 860 may be encountered in a data-center that must handle very large amounts of artificial intelligence processing tasks. This MMMD operation paradigm 860 may still need to be able to handle jobs that require low latency and thus provisions must be made for flagging important data jobs. With both multiple different ANN models and multiple different batches of data samples that need to be handled simultaneously, there are huge number of different possible ways to address the allocation of resources and scheduling of jobs.

Overview of Artificial Neural Network Processing

To most efficiently perform the processing required for artificial neural network (ANN) models, the system of the present analyzes each ANN model, allocates resources for each model, create scheduling work queues for each model, and then execute the work schedules on the matrix processors. This section provides an overview of that entire processing system with reference to FIG. 9.

Figure 9:
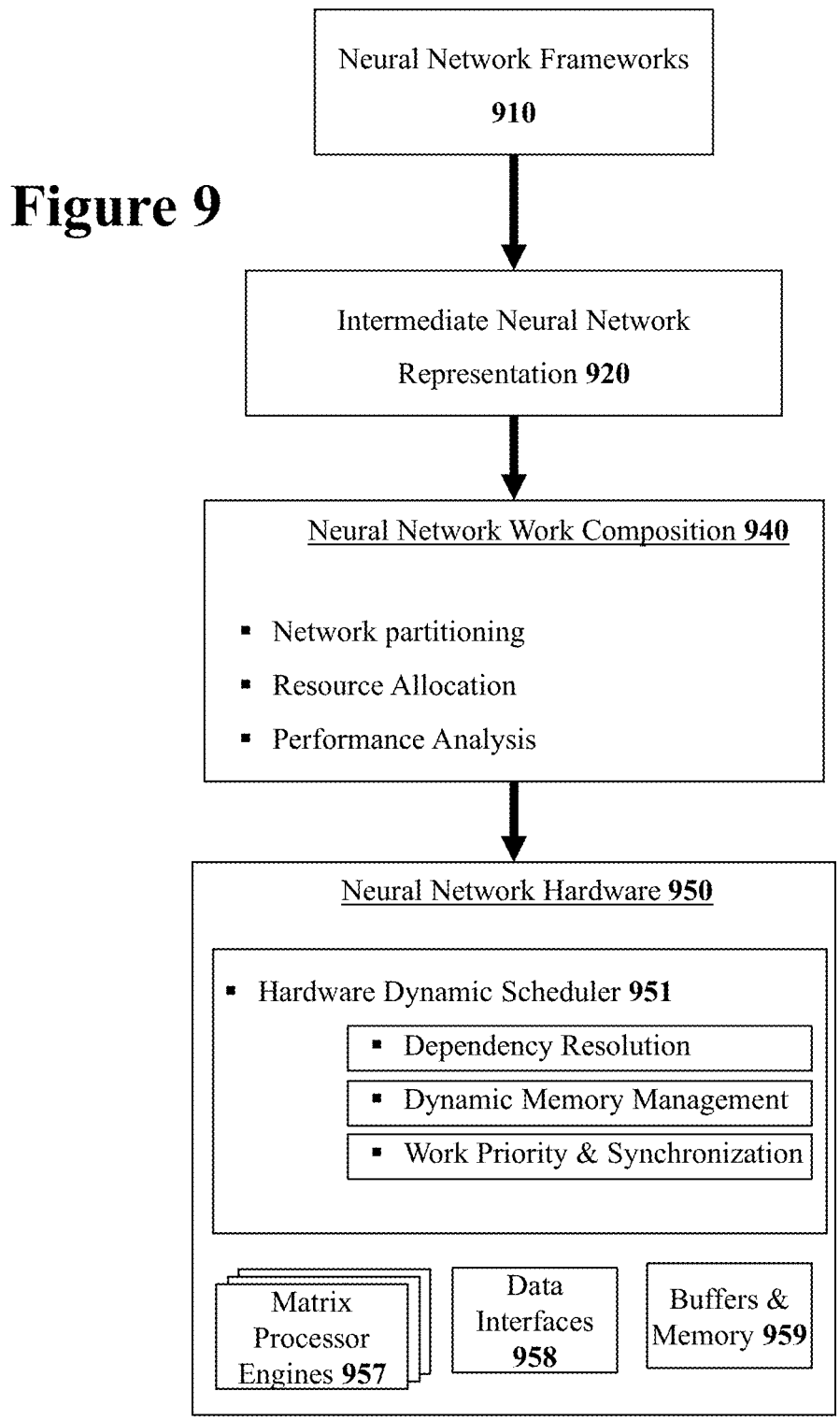
FIG. 9 illustrates an overview of neural network processing system for preparing a neural network for execution.

The source information at the top of FIG. 9 is the existing neural network framework 910. The neural network framework 910 may be one of several different neural network frameworks such as TensorFlow, Keras, PyTorch, Caffe2, Deeplearning4j, and other suitable framework for building artificial neural networks. The various neural network frameworks 910 allow developers to build deep artificial neural network models quickly and easily. The neural network frameworks 910 provide developers a clear and concise way for defining artificial neural network models using a collection of pre-built and optimized components.

Since there are several different neural network frameworks 910 that different developers may choose to use, the information from these several neural network frameworks 910 may be processed into more unified intermediate neural network representations 920. Two commonly used intermediate representations include the Open Neural Network Exchange (ONNX) and Accelerate Linear Algebra (XLA). In this manner, many different neural network frameworks 910 can more easily be supported.

The intermediate neural network representations 920 comprise a computational dataflow graph in the form a directed acyclic graph (DAG). The computational dataflow graph of the intermediate neural network representation 920 describes all of the computational operations to be performed for a particular artificial neural network model. The intermediate neural network representations 920 can then be provided to a neural network computational system that will then execute the artificial neural network model.

In the system of the present disclosure, the intermediate neural network representation 920 is provided to the Neural Network Work Composition system 940. The Neural Network Work Composition system 940 analyzes the intermediate neural network representation and then partitions the neural network representation, allocates resources, and performs performance analysis to determine how neural network representations will be allocated into the hardware. This allocation system will be described in more detail in the next section.

Finally, after the resource allocation, the neural network is provided to the neural network hardware 950 for execution. A key component of the neural network hardware 950 is the hardware dynamic scheduler 951. The hardware dynamic scheduler 951 is responsible for carefully controlling all of the execution hardware that will be used to execute the artificial neural network. Specifically, the hardware dynamic scheduler 951 controls the matrix processor engines 957 that perform the computations, the data interfaces 958 between the various units, and the buffers & memory systems 959.

The hardware dynamic scheduler 951 performs several functions. The hardware dynamic scheduler 951 resolves the data dependencies and creates work queues for processing. The hardware dynamic scheduler 951 dynamically handles memory management to ensure each job has needed memory resources and there are no memory overflows. And the hardware dynamic scheduler 951 handles work priority and synchronization.

Neural Network Partitioning and Resource Allocation

Figure 10:
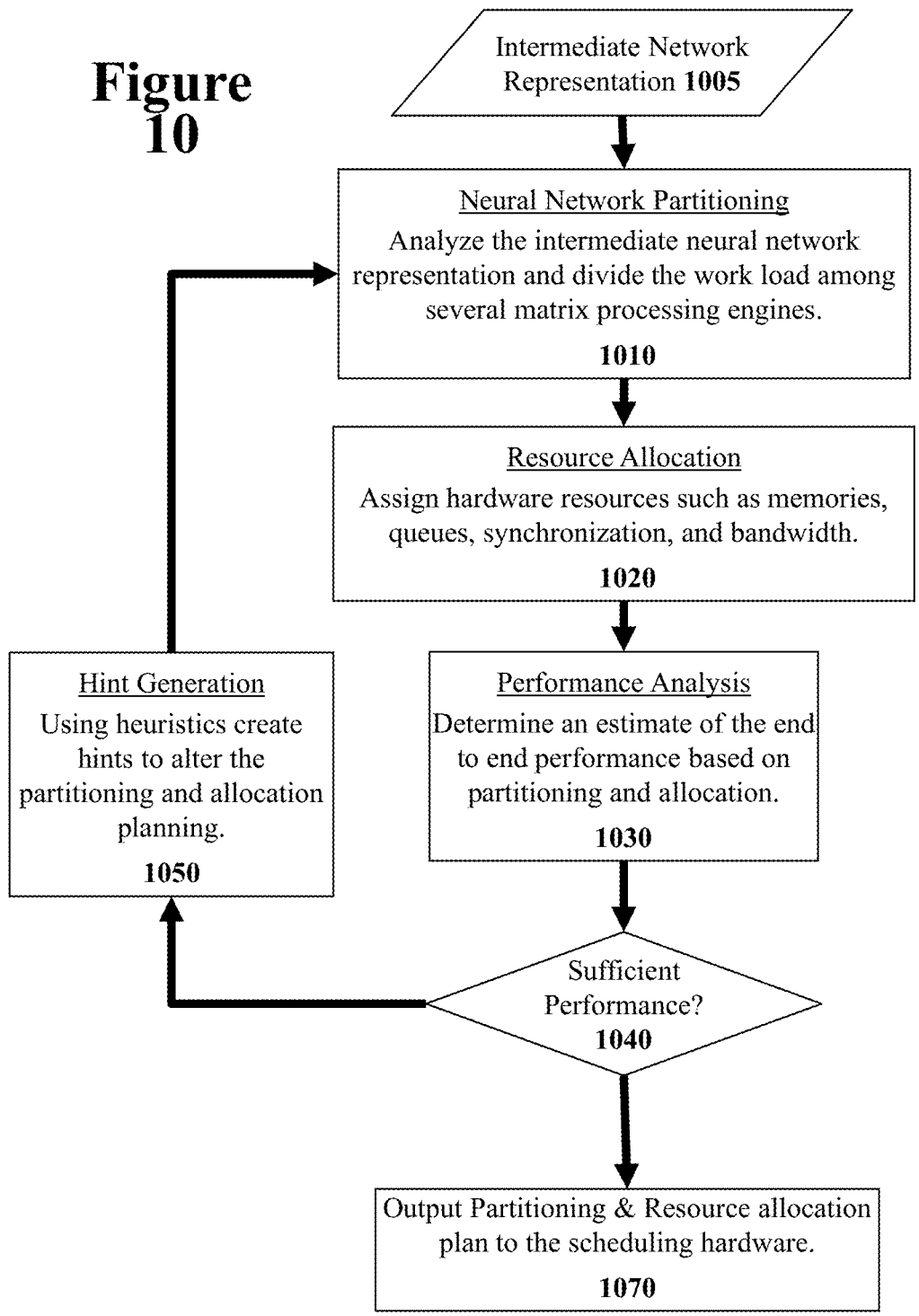
FIG. 10 illustrates a flow diagram illustrating how a Neural Network Work Composition system operates.

Referring again to FIG. 9, the Neural Network Work Composition system 940 analyzes the intermediate neural network representation in order to partitions the neural network representation for the hardware and allocates needed resources. This is an extremely difficult task to do well since the allocations can be performed in so many different ways and it is difficult to find the optimal allocations. In order to explore the potential allocation space, an iterative approach is used. FIG. 10 illustrates a flow diagram describing how the Neural Network Work Composition system operates.

At the top of FIG. 10, the intermediate neural network representation 1005 is provided as the input data. The first processing stage is a neural network partitioning stage 1010. The goal of the partitioning is to distribute the computational tasks evenly across the available matrix processor engines in order to maximize utilization of the matrix processor engines. Thus, the neural network partitioning stage 1010 analyzes computation dataflow and then attempts to evenly partition the different computational stages of the computation dataflow among the available matrix processor engines.

After the neural network partitioning, the next stage is the resource allocation stage 1020. The in addition to the matrix processor engines, the neural network hardware has other resources such as memory systems, synchronization flags, memory bandwidth, off-chip interface bandwidth, etc. The resource allocation stage 1020 assigns these resources to the various different computational stages of the computation dataflow. After the resource allocation stage 1020, a proposed partitioning of the computation dataflow and allocation of resources has been created.

Next, a Performance Analysis stage 1030 carefully analyzes the proposed partitioning and resource allocation. Specifically, the computational dataflow is analyzed end-to-end with the proposed partitioning and resource allocation to determine an estimate of the performance. An estimate of the performance of each computational stages of the computation dataflow is created.

The performance estimate is then examined at stage 1040. If the estimated performance is not deemed sufficient then the system proceeds to Hint Generation stage 1050. The Hint Generation stage 1050 uses heuristics to create a set of hints that will alter the output from the neural network partitioning stage 1010 and the resource allocation stage 1020 after a next run through those stages. For example, the sub estimates of the various computational stages are examined and those with poor performance estimates will be assigned additional resources to improve performance. For example, if there is a bad balance between matrix processor engines or if there is a shortage of memory resources, those inadequacies will be used to change the partitioning and allocation of resources. The system can then repeat the neural network partitioning stage 1010 and the resource allocation stage 1020 to generate a new proposed partitioning and resource allocation.

The system may perform repeated iterations of stages 1010, 1020, 1030, 1040, and 1050 in order to determine a good partitioning and resource allocation. Referring back to stage 1040, after a sufficient partitioning and resource allocation has been created, the system proceeds to output the partitioning and resource allocation plan to the neural network hardware for execution at stage 1070.

Neural Network Job Scheduling Policies Goals

Scheduling neural network processing jobs involves several different goals. To complicate matters, these different goals often conflict with each other. The conflicting goals may be resolved by examining the urgency of the different jobs or maximizing utilization. This section describes the various scheduling policy goals and later sections will describe how the scheduling system achieves these goals.

Prioritization—A first goal is simply respecting processing job priority. Processing jobs that are given higher priority should in general be processed before jobs with lower priority. In the system disclosed in this document, the priority numbers are reversed such that the lowest assigned priority number is actually the highest priority job. Thus, the dynamic scheduler picks lowest priority. Ties of priority are generally broken with either a round-robin or First-In-First-Out (FIFO) system.

Earlier Samples Get Higher Priority—In general, earlier sample vectors are given higher priority than later sample data vectors. By giving earlier samples higher priority, this allows earlier jobs to finish processing and thereby free up resources such as memory as soon as possible. Furthermore, when computational tasks are split among several matrix processor engines, then the matrix processing engines assigned to handle the later computations may sit idle until work becomes available. Thus, prioritizing earlier samples will ensure that the matrix processing engines assigned to handle the later computations are fed with work as soon as possible.

Create Work Faster—Data dependencies limit the amount of possible computational operations that can be selected for execution. For example, back propagation and gradient update computations cannot be performed until the earlier forward pass computations are performed first. Thus, forward pass operations should in general be assigned higher priority than back propagation operations. And back propagation operations are generally given higher priority than gradient update operations. Note that this policy goal contradicts the "earlier samples get higher priority" policy above to some degree since a completing a gradient update operation will free up some memory resources whereas a forward pass operation or a backward propagation operation will create work faster. Which policy goal is chosen may depend on the current context of whether memory resources are low or if utilization is paramount.

Defer Work That Is Not in The Pipeline Critical Path—Gradient updates are not in the critical path of completing a batch or creating new work. Therefore, gradient updates may be given lowest priority. Again, this may conflict with other goals such that deferring gradient updates may create memory pressures and thereby raise the priority of gradient updates.

Context Switch to More Important Operations—The processing operations that are receive may be assigned important ratings or require low-latency. Therefore, context-switching may be used to switch resources to more important tasks.

Dynamic Memory Management—As previously mentioned above, the memory resources are limited and thus the scheduling system must carefully monitor memory resources to ensure that system does not run out of memory. The memories can become filled with intermediate results that will be for later calculations. To handle memory constraints the system can move data off of a matrix processor engine chip to larger memory system but this requires memory bandwidth and slows computations.

Ensure Fairness Between Jobs—The above policies are used to reduce latency and maximize utilization. However, strictly following those policies may result in certain jobs being ignored. Thus, the scheduling policy must ensure a degree of fairness so that no jobs are ignored to maximize efficiency.

Scheduling Procedure

Referring back to FIG. 9, the hardware dynamic scheduler 951 takes the policies goals of the previous section and uses those policy goals to guide the scheduling of processing operations. The hardware dynamic scheduler 951 accomplishes by creating a set of work queues filled with ordered computational operations, assigning priorities to the computational operations, and then dispatching the computational operations for execution using the queue ordering and the priorities. This method of scheduling will be described with reference to FIG. 11.

Figure 11:
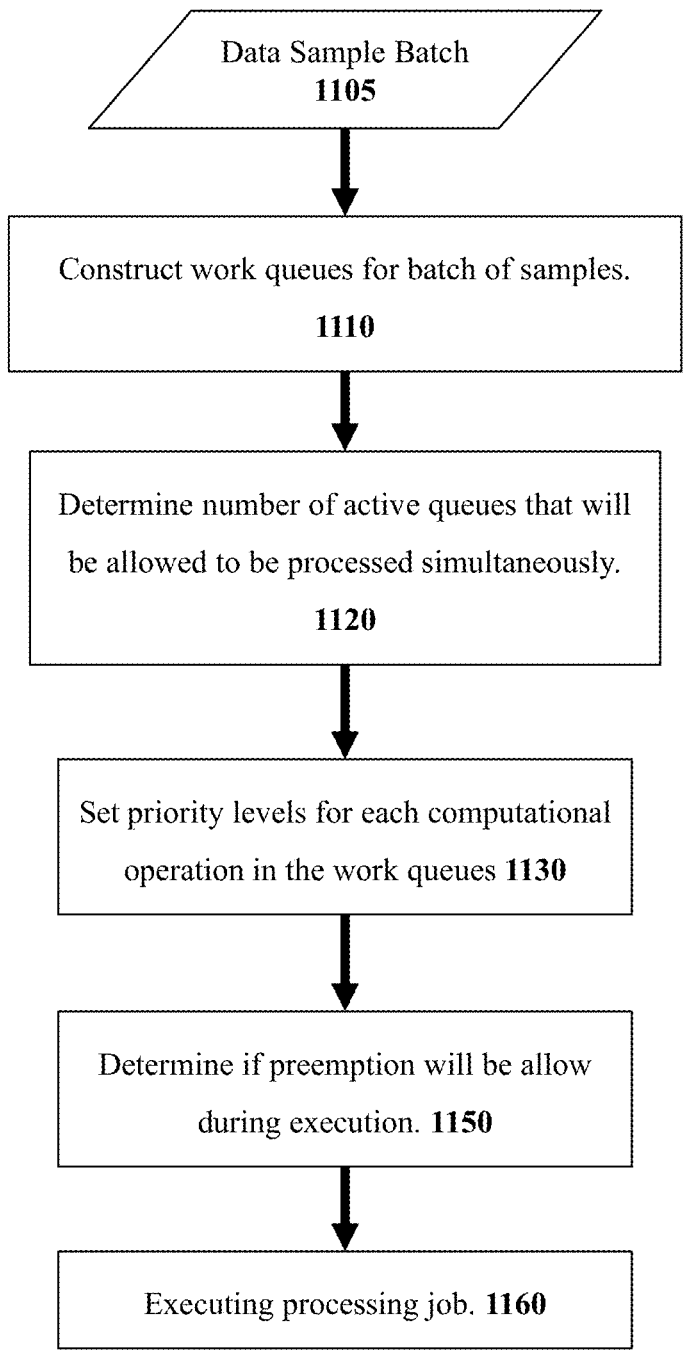
FIG. 11 illustrates a flow diagram illustrating how a Neural Network Dynamic Scheduler prepares a batch of data samples for processing through an artificial neural network.

Referring to FIG. 11, a data sample batch 1105 for a particular neural network model is the input for the scheduling system. The first and largest task is to first create a set of work queues for the batch of data samples 1105 at stage 1110.

Each work queue is an ordered set of computational operations that need to be performed in order to complete a particular job. The following list describes a set of commonly used computational operations that can be placed into work queue although additional computational operations can be added and signalling flags may also be placed into a work queue.

TABLE 1

Computation Jobs

Forward Pass (FP) - Calculate the forward pass for a layer.
Back Propagation (BP) - Calculate the backward propagation for a
Loss (Loss) - Calculate loss of the inference
Gradient update (GU) - Calculate gradient update for data sample.
Re-computation (RC) - Recompute a dropped FP calculation
Weight Update (WU) - Update the weight matrix with gradients
Data Parallel Merge (PM) - Combine parallel gradient updates
To illustrate how work queues are created some examples are hereby provided. For a first example, consider the small two layer artificial neural network (ANN) of FIG. 1B with two layers referred to as L1 and L2. A small batch of two data samples referred to as S1 and S2 may be provided to the two-layer ANN of FIG. 1B for full training processing (forward pass, back propagation, and gradient update). Using the computational operation abbreviations from the previous table, the two work queues (WQ1 and WQ2) for the two data samples (S1 and S2)

TABLE 2

Example Work Queues

| [WQ1] | [WQ2] |
|---|---|
| S1 L1 FP | S2 L1 FP |
| S1 L2 FP | S2 L2 FP |
| S1 L2 BP | S2 L2 BP |
| S1 L2 GU | S2 L2 GU |
| S1 L1 BP | S2 L1 BP |
| S1 L1 GU | S2 L1 GU |

A second work queue example can be provided for the four-layer artificial neural network (ANN) of FIG. 5A. Consider a batch of three data samples for a full training processing through the four-layer ANN of FIG. 5A. The three work queues for those three data samples is illustrated in FIG. 6B.

The ordered work queues are used to help ensure that the data dependencies of the computational operations are respected. In this manner, the scheduling system can ensure that required data will be available when accessing the top of the work queues.

Referring back to FIG. 11, after creating the work queues at stage 1110, there are few more stages before the work queues are dispatched for execution. The next step is to determine the number of active queues that will be allowed at stage 1120.

With a large batch of samples, there will be many sets of work queues for execution. Allowing a large number of queues to execute in parallel might provide good utilization of computational resources. However, with a large number of work queues executing in parallel, the memory resources may become constrained and there may be greater latency of getting work queue completion. Therefore, the scheduling system will determine the number of work queues that may be actively processed simultaneously.

For example, to reduce memory consumption only two active queues may be allowed despite a large number of work queues created. The system will then start operation on two work queues but all the other work queues will wait. Specifically, the other work queues will need to wait for one of the earlier dispatched work queues to complete operation before it can begin executing. The scheduling system may use memory allocation information from neural network work composition system 940 of FIG. 9 to help determine the number of active queues.

Referring back to FIG. 11, after determining the number of allowed active queues at stage 1120, the system proceeds to stage 1130 where it determines priority levels for each computational operation within the work queues that were created at stage 1110. The system determines the priority levels for each computational operation using the neural network scheduling policies of the previous section.

All incoming data batches are tagged with an importance scale. For example, a real-time natural language processing job from a smart device may be received with a high importance scale value in order to minimize latency. Other jobs such as examining digital images and attempting to automatically add tags to the digital images may be received with a low importance scale value such that the job that is to run when there are no other more important jobs to run. All of this information will be used to properly assign the priorities in manner than will ensure the proper processing.

Finally, at stage 1150, the scheduling system will determine if pre-emption will be allowed during the processing, which occurs at stage 1160. Pre-emption allows processing jobs to be paused to allow other processing jobs to begin execution.

Scheduling Case 1—Minimal Latency

Figures 12A, 12B:
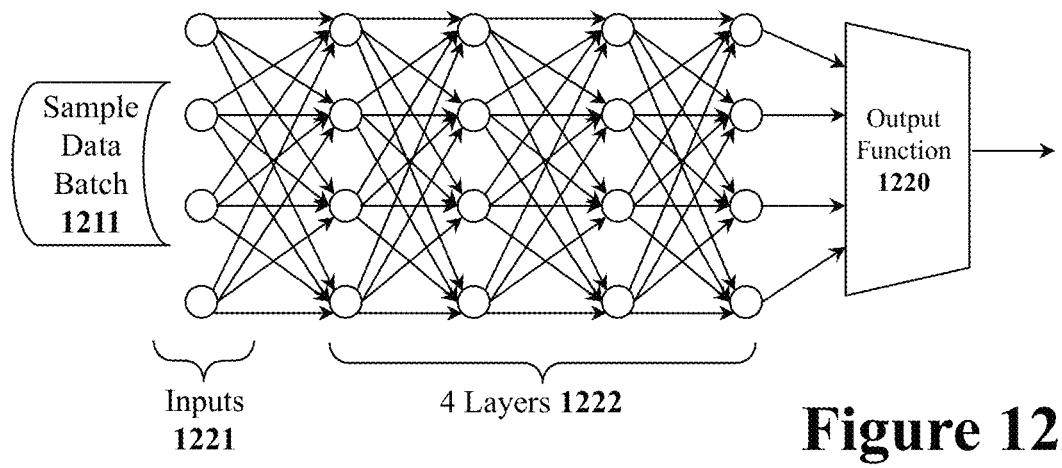
FIG. 12A illustrates a four-layer artificial neural network for a first example scheduling operation.
FIG. 12B illustrates a set of four work queues for processing four data samples through the artificial neural network of FIG. 12A with low latency.

FIG. 12A illustrates a four-layer artificial neural network for a first example scheduling operation. The first scheduling example has a sample data batch 1211 that contains four data samples that need to be processed with an inference operation. This means each data sample needs to be processed with a forward pass (FP) computational operation through all four of the network layers. Furthermore, in this particular example the four data sample batch must be processed with minimal latency. This particular job is being performed with a single linear algebra matrix processor that will be referred to as "server 0".

The first step is to create a set of four work queues, one for each data sample to be processed. FIG. 12B illustrates a set of four work queues (1251, 1252, 1253, and 1254) for performing the processing job described in the previous paragraph. Since this is just an inference operation each of the four work queues only requires four forward pass (FP) computational operations, one for each layer of the four-layer ANN of FIG. 12A.

In this case, the objective is to minimize latency such that the four data samples are prioritized in manner that will most quickly complete all of data samples. Thus, the computational operations are prioritized in the same order of the data samples. Thus, all of the computational operations for the first data sample in work queue 1251 are given the highest priority, priority 0 (recall that this disclosure gives higher priority to the lowest priority number). All of the computational operations for the second data sample in work queue 1252 are given priority 1 and so on for work queues 1253 and 1254. With this prioritization, the four computational operations should be completed as quickly as possible in the same order.

Furthermore, for this case, the system enables pre-emption. By enabling pre-emption, the system will allow higher prior work to context switch from lower priority work. This minimizes latency for this job although throughput may suffer.

Scheduling Case 2—Maximize Throughput

Figures 13A, 13B:
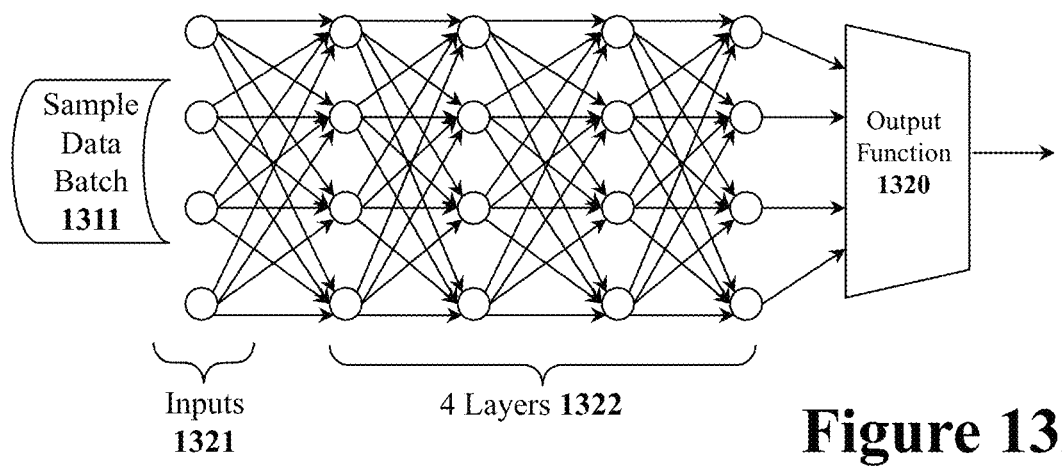
FIG. 13A illustrates a four-layer artificial neural network for a second example scheduling operation.
FIG. 13B illustrates a set of four work queues for processing four data samples through the artificial neural network of FIG. 13A with maximum throughput.

FIG. 13A illustrates the same four-layer artificial neural network for a second example scheduling operation. Again, this scheduling example has a sample data batch 1311 that contains four data samples that need to be processed only with an inference operation. However, in this second example the four data sample batch must be processed with maximum throughput.

Once again, the first step is to create a set of four work queues (1351, 1352, 1353, and 1354), one for each data sample to be processed as illustrated in FIG. 13B. Again, since this is just an inference operation each of the four work queues only require forward pass FP computational operations.

In this second example, the objective is to maximize throughput such that the computational operations are prioritized in manner that will ensure maximum utilization. Thus, the computational operations are prioritized in a manner that achieves the most parallel computations. Thus, all of the computational operations for the first network layer are given the highest priority, priority 0. All of the computational operations for the second network layer are given priority 1 and so on for network layers 3 and 4. Thus, all four work queues (1351, 1352, 1353, and 1354) have their four computational operations ordered as 0, 1, 2, and 3. With this prioritization scheme, the computational operations should be completed with as much parallelized computations as possible. It should be noted that whenever there is a tie between work queues that have computational operations ready to execute a round-robin system may be used to select which queue will have a computational operation dispatched.

Note that if there are memory constraints or other resource constraints, the scheduling system may limit the number active queues in order to reduce resource usage. In this example, the system may disable pre-emption to maximize throughput. Pre-emption may waste time moving data around and thus reduce the throughput of the system.

Scheduling Case 3—Multi-Server Inference

Figures 14A, 14B:
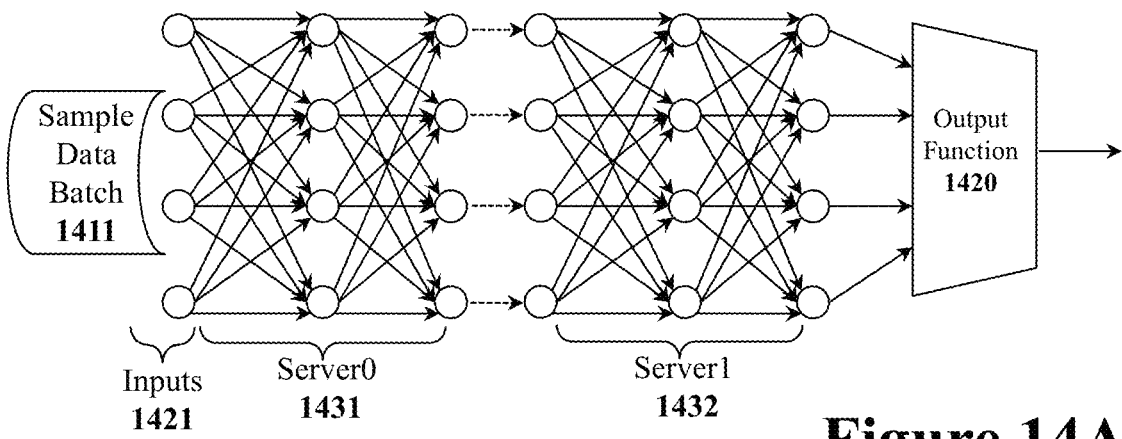
FIG. 14A illustrates a four-layer artificial neural network split across two servers for a third example scheduling operation.
FIG. 14B illustrates a set of eight work queues for processing four data samples through the artificial neural network of FIG. 14A with two servers with minimal latency.

FIG. 14A illustrates a four-layer artificial neural network for a third example scheduling operation with a sample data batch 1411 that contains four data samples that need to be processed with an inference operation. In this third scheduling example, the four-layer artificial neural network has been split into two halves and the two halves are each handled by different linear algebra matrix processor. Specifically, as illustrated in FIG. 14A the first two layers will be handled by a first matrix processor labelled "server 0" 1431 and the second two layers will be handled by a second matrix processor labelled "server 1" 1432. Splitting the ANN evenly across the server 0 1431 and server 1 1432 achieves balance such that maximum utilization will be achieved. Furthermore, in this particular example the four data sample batch must be processed with minimal latency.

Again, the first step is to create a set of eight work queues, one for each of the four data samples to be processed to be processed by server 0 1431 and one for each of the four data samples to be processed by server 1 1432. FIG. 14B illustrates the eight work queues wherein there are two work queues on top of each other for columns 1451, 1452, 1453, and 1454. Since this is just an inference operation, the eight work queues only require two forward pass (FP) computational operations in each work queue. There are four forward pass (FP) computational operations for the ANN that are split between server 0 1431 and server 1 1432. Specifically, the two forward pass (FP) computational operations for layers 0 and 1 of the ANN are assigned to server 0 1431 for each queue and the two forward pass (FP) computational operations for layers 2 and 3 of the ANN are assigned to server 1 1432 for each work queue.

For this third example the objective is to maximize utilization of the two different servers: server 0 1431 and server 1 1432. To accomplish this, server 0 1431 should attempt to complete its forward pass (FP) computational operations so that the output data can be passed to server 1 1432 such that server 1 1432 can start processing. Thus, the FP computational operations in server 0 1431 are prioritized in manner that will most quickly complete all of data samples. This is very important in this example since the second server (server 1 1432) will be idle until it receives output data from the lower two layers in server 0 1431.

To achieve this goal, the computational operations are prioritized in the same order of the data samples as set forth in the first example. Thus, all of the computational operations for the first data sample in the two work queues in column 1451 are assigned priority 0; all of the computational operations for the second data sample in the two work queues of column 1452 are assigned priority 1, and so on for the work queues in column 1453 and column 1454. With this prioritization, the computational operations should be completed as quickly as possible in the same order.

Again, as with the first case, the system enables pre-emption in this case. By enabling pre-emption, the system will allow higher prior work to context switch from lower priority work. Furthermore, by enabling pre-emption, this enables the later stage servers (which are dependent on data from previous servers) to have higher utilization by processing other jobs when the later stages are waiting for data.

Scheduling Case 4—Single Server Training—Minimize Memory

Figures 15A, 15B:
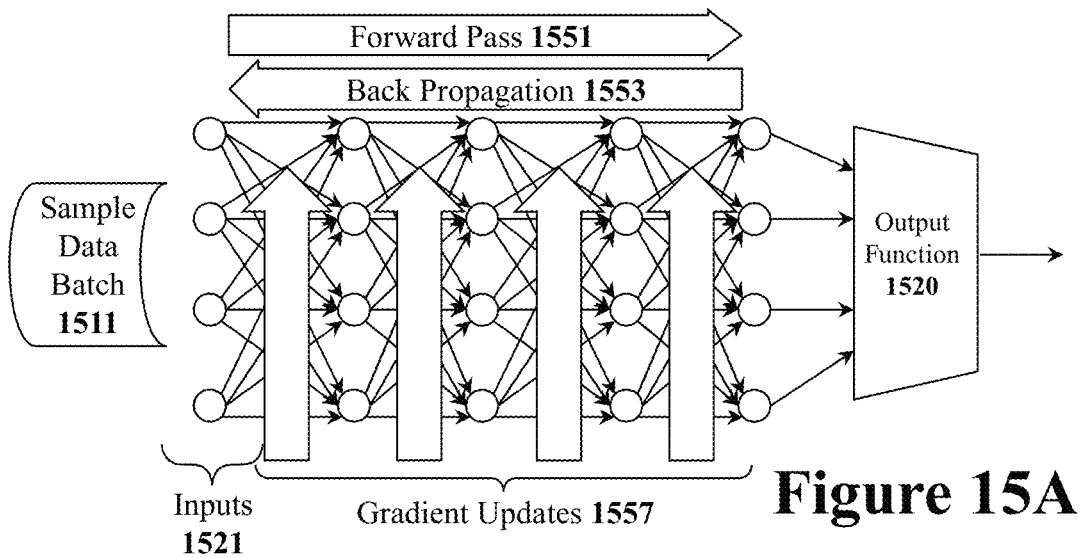
FIG. 15A illustrates a four-layer artificial neural network for a fourth example scheduling operation with a full training session.
FIG. 15B illustrates a set of four work queues for processing four data samples through a full training session on the artificial neural network of FIG. 15A.

FIG. 15A illustrates a four-layer artificial neural network for a fourth example scheduling operation. The fourth scheduling example has a sample data batch 1511 that contains four data samples that need to be processed with a full training cycle. This means all four data samples in the batch 1511 needs to be processed with forward pass (FP) 1555, back propagation 1559, and gradient update 1557 computational operations. Furthermore, in this particular scheduling example the four data samples must be processed while minimizing usage of resources such as memory.

The first step is to create work queues for each of the four data samples to be processed. FIG. 15B illustrates a set of four work queues (1551, 1552, 1553, and 1554), one for each data sample. Since this is a full training operation, each of the four work queues requires four forward pass (FP), four back propagation (BP), and four gradient update (GU) computational operations. Furthermore, the computational operations are placed in an order of with the four layers of forward pass (FP) operations in ascending order, then four of back propagation (BP) and gradient update (GU) computational operations in descending order.

This ordering of computational operations in the work queue maintains the data dependencies and optimizes the scheduling efficiency. For example, by placing each gradient update (GU) operations immediately after the corresponding back propagation (BP) operations for each layer, the memory resources used by each layer can be freed up as soon as the gradient update (GU) operation is completed.

In addition to the ordering of the computational operations, the priorities for each work queue should be set to minimize latency. Specifically, the priorities should be set in a manner that will most quickly complete all of data samples in order to minimize latency. Thus, the computational operations are prioritized in the same order of the data samples. So, as illustrated in FIG. 15B, all of the computational operations for the first work queue 1551 are given the highest priority 0. All of the computational operations for the second data sample in work queue 1552 are given priority 1 and so on for work queues 1553 and 1554. With this prioritization scheme, the four work queues should be completed as quickly as possible in generally the same order as the data samples such that after each work queue is completed, all of the resources used by that work queue are freed up.

To further minimize resource usage for this case, the system enables pre-emption. By enabling pre-emption, the system will context switch from lower priority work to higher priority work in order to complete the higher priority work as soon as possible. Once a higher priority work queue is completed then all of the resources used by that work queue can be freed up.

Scheduling Case 5—Single Server Training—Maximize Throughput

Figures 16A, 16B:
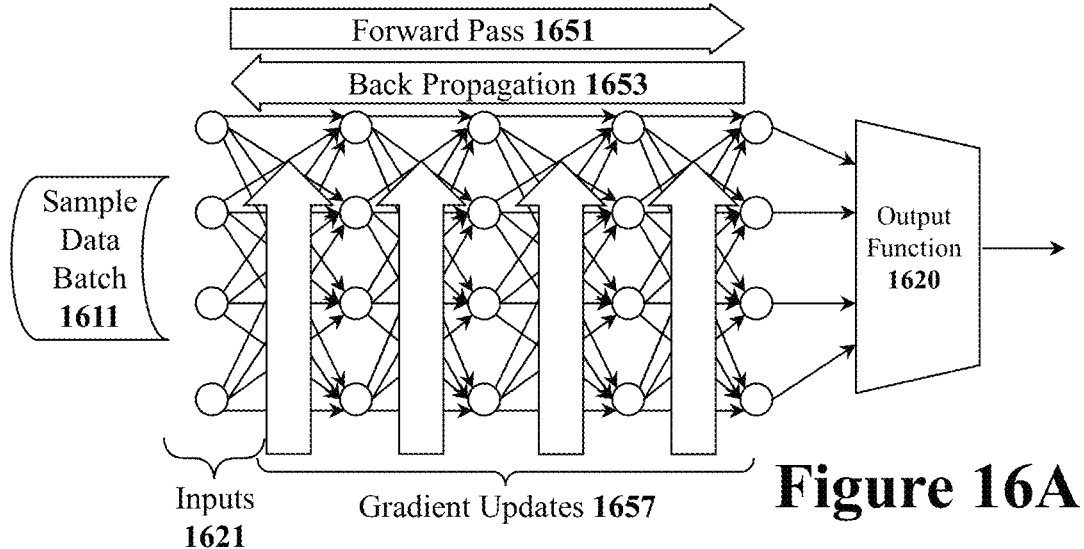
FIG. 16A illustrates a four-layer artificial neural network for a fifth example scheduling operation with a full training session.
FIG. 16B illustrates a set of four work queues for processing four data samples through a full training session on the artificial neural network of FIG. 16A.

FIG. 16A illustrates a four-layer artificial neural network (ANN) for a fifth example scheduling operation. This fifth scheduling example has a sample data batch 1611 that contains four data samples that need to be processed with a full training cycle through the artificial neural network (ANN). Furthermore, in this fifth example scheduling case the four data samples must be processed while maximizing throughput of the ANN processing system.

The first step is to create work queues for each of the four data samples in batch 1611 to be processed. FIG. 16B illustrates a set of four work queues (1651, 1652, 1653, and 1654), one for each data sample. Since this is a full training operation as in the previous example, each of the four work queues requires four forward pass (FP) 1655 computational operations, four back propagation (BP) 1659 computational operations, and four gradient update (GU) 1657 computational operations.

In this fifth scheduling example, the goal is to maximize the throughput for the processing system. Therefore, the scheduling system should prioritize the computational operations in the work queues in a manner that enables the most amount of parallel processing. Therefore, as with the second example case described with reference to FIGS. 13A and 13B, the priorities of the computational operations should be set with the highest priority for the earliest computational operations and the lowest priority for the final computational operations. Thus, all of the first computational operations in each work queue are given priority 0. All of the second computational operations in each work queue are given priority 2 and so on for all of the remainder of computational operations in the work queues. Thus, all four work queues (1651, 1652, 1653, and 1654) have their twelve computational operations sequentially ordered as 0, 1, 2, . . . 10, 11. This is essentially a layer-first type of priority system that will attempt to process as many computational operations in parallel as possible and thereby achieve maximum throughput.

Note that if there are memory constraints or other resource constraints, the scheduling system may limit the number active queues in order to reduce resource usage. Furthermore, for this example that is designed to maximize throughput, the system may disable pre-emption. Pre-emption may waste time moving data around and thus reduce the throughput of the system.

Scheduling Case 6—Multi-Server Training

Figures 17A, 17B:
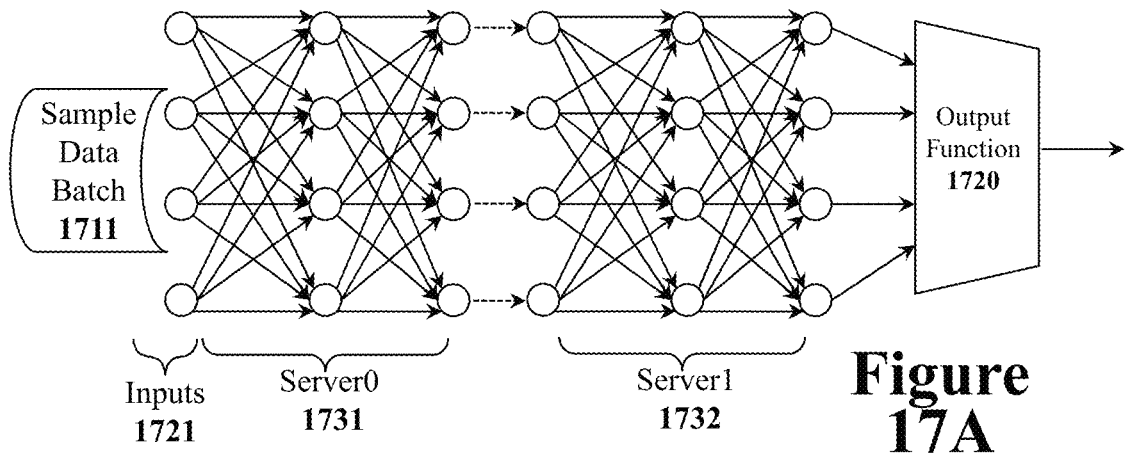
FIG. 17A illustrates a four-layer artificial neural network split across two servers for a sixth example scheduling operation.
FIG. 17B illustrates a set of eight work queues for processing four data samples through the artificial neural network of FIG. 17A with two servers.

FIG. 17A illustrates a four-layer artificial neural network (ANN) for a sixth example scheduling operation. The sixth scheduling example has a sample data batch 1711 that contains four data samples that need to be processed with a full training cycle through the ANN. In this sixth scheduling example, the four-layer artificial neural network has been split into two halves and the two halves are each handled by different linear algebra matrix processor. Specifically, as illustrated in FIG. 17A the first two layers will be handled by a first matrix processor labelled "server 0" 1731 and the second two layers will be handled by a second matrix processor labelled "server 1" 1732. Splitting the ANN evenly across the two servers achieves balance such that maximum utilization will be achieved.

The first step is to create a set of eight work queues, four work queues for each of the four data samples handled by server 0 1731 and four work queues for each of the four data samples handled by server 1 1732. FIG. 17B illustrates a set of eight work queues wherein there are two work queues (one for server 0 1731 and one for server 0 1732) in each of columns 1751, 1752, 1753, and 1754 for performing the processing job. Since this is a full training session, the system has two forward pass (FP), two back propagation (BP), and two gradient update (GU) computational operations for the first two layers handled by the work queues for server 0 1731 and the same six computational operations for the second two layers handled the work queues for server 1 1732.

Next, the priorities for the computational operations must be assigned. In order to quickly have the second server (server 1 1732) begin operating; the two forward pass (FP) computational operations are given a high priority setting. This will ensure that server 0 1731 quickly completes operations and passes data to server 1 1732. Similarly, the back propagation (BP) computational operations in server 1 1732 are assigned a high priority so that they are completely quickly and return data to server 0 1731 such that it can complete its back propagation (BP) computational operations.

However, the gradient update operations are given a much low priority value since those operations are not on the critical execution path needed to ensure good utilization. The gradient update (GU) computational operations can be handled when there are no higher priority computational operations since no additional operations are dependent on information from the gradient update (GU) computational operations. With this prioritization scheme, all of the forward pass (FP) and back propagation (BP) computational operations for all four work queues should be completed as quickly as possible in generally the same order as the data samples. This ensures high utilization. The lower priority gradient update computational operations will be completed later.

To ensure the critical path operations are completed first, the system enables pre-emption for this example. By enabling pre-emption, the system will context switch from lower priority work to higher prior work in order to complete that work that lies along the critical path. If there are memory constraints or other resource constraints, the scheduling system may limit the number active queues in order to reduce resource usage.

Scheduling Case 7—Multi-Server Training—Recomputation

FIG. 18A illustrates a four-layer artificial neural network (ANN) for a seventh example scheduling operation that will describe the use of recomputation operations. This seventh scheduling example has a sample data batch 1811 that contains four data samples that need to be processed with a full training cycle through the ANN of FIG. 18A. In this seventh scheduling example, the four-layer artificial neural network has again been split into two halves and the two halves are each handled by different linear algebra matrix processor. Specifically, as illustrated in FIG. 18A the first two layers will be handled by a first matrix processor labelled "server 0" 1831 and the second two layers will be handled by a second matrix processor labelled "server 1" 1832. Splitting the ANN evenly across the two servers achieves balance such that maximum utilization will be achieved.

The first step is to create a set of eight work queues, one work queue for each of the four data samples to be processed in both server 0 1831 and server 1 1832. FIG. 18B illustrates a set of eight work queues wherein there are two work queues in each column 1851, 1852, 1853, and 1854; the upper work queue is for server 0 1831 and the lower work queue is for server 1 1832. Since this is a full training session, the system has two forward pass (FP), two back propagation (BP), and two gradient update (GU) computational operations for the work queues handling the first two layers in server 0 1831 and the same six computational operations for the work queues handling second two layers in server 1 1832.

In this particular scheduling example, the system will use a technique known as recomputation in order to save memory resources. Specifically, the intermediate data from the initial two forward processing (FP) computational operations in server 0 1831 for the first two ANN layers will be discarded. In order to complete later back propagation (BP) computational operations, those two forward processing (FP) computational operations will need to be recomputed. This is performed with recompute (RC) operations in the work queues for server 0 1831. Furthermore, the work queues for server 0 1831 include flag entries labelled "wait". The "wait" flag indicates that the particular work queue should pause operations until the work queue receives a "notify" message from the corresponding work queue in server 1 1832 indicating that data is now available to resume operations. The "wait" flag is placed right after the two forward processing (FP) computational operations in the work queues. Note that this "wait" flag prevents the server 1 1832 from consuming resources until the data that it needs to resume operation is available.

Referring to the work queues for server 1 1832, the work queues contain two forward pass (FP) computational operations to complete the top two layers of the ANN and then two back propagation (BP) operations to being the back propagation. After the two back propagation (BP) computational operations a "notify" flag is used to inform the corresponding work queue in server 0 1831 that the work queue may resume operations since the required data from the back propagation (BP) operations is now available. Then the remaining two gradient update (GU) operations in server 1 1832 then complete the work queue for server 1 1832.

Referring back to the work queues for server 0 1831, after the "notify" message is received, the work queues in server 0 1831 will resume operations. First the two the recompute (RC) operations will recreate the discarded intermediate data from the previous forward pass (FP) computational operations. Next the back propagation (BP) computational operations can then be performed. Finally, the last two gradient update (GU) computational operations are performed.

The priorities for the computational operations in all the work queues must be set. In this example, a "sample first" priority system is used in order to complete each sample as quick as possible so that memory resources can be freed up.

To ensure the critical path operations are completed first, the system enables pre-emption for this example. By enabling pre-emption, the system will context switch from lower priority work to higher prior work in order to complete that work to free up resources. If there are memory constraints or other resource constraints, the scheduling system may limit the number active queues in order to reduce resource usage.

Scheduling Case 8—Single Server with Multiple Jobs

Figures 19A, 19B:
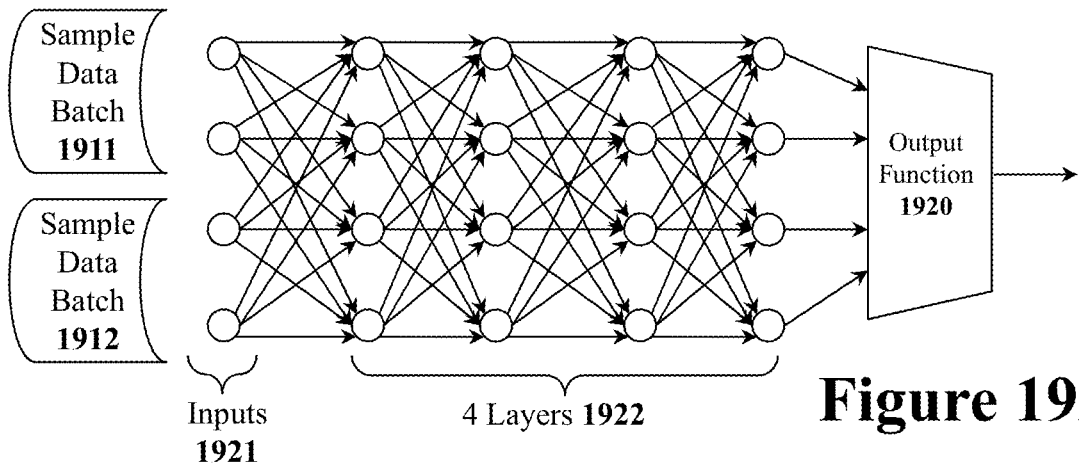
FIG. 19A illustrates a four-layer artificial neural network for an eighth example scheduling operation with an inference operation with two jobs.
FIG. 19B illustrates a set of four work queues for processing two data samples from two different jobs through an inference operation on the artificial neural network of FIG. 19A.

FIG. 19A illustrates a four-layer artificial neural network for an eighth example scheduling operation. This eighth scheduling example has two different sample data batches 1911 and 1912 associated with two different jobs: Job 1 1971 and Job 2 1972. Each job has two data samples that need to be processed with an inference operation. Thus, each data sample needs to be processed with four forward pass (FP) computational operation s associated with the four of the network layers 1922. In this example, it is a goal to keep fairness between the jobs such that both jobs receive execution resources and neither is stalled.

The first step is to create a set of four work queues, one for each of the two data samples to be processed for Job 1 and one for each of the two data samples to be processed for Job 2. FIG. 19B illustrates two work queues for Job 1 1971 (work queues 1951 and 1952) and two work queues for Job 2 1972 (work queues 1953 and 1954). Since this is just an inference operation, each of the four work queues only requires four forward pass (FP) computational operations, one for each layer of the four-layer ANN of FIG. 19A.

In this case, the objective is to ensure fairness between the two jobs. To achieve this goal the priority values of the two jobs can be set to equal priority. Though in practice, the system may use algorithms like DWRR (Deficit Weighted Round Robin) to guarantee priority and fair share of resources between jobs.

At a higher level, the amount of processing that each job received can be monitored to determine if adequate fairness between the jobs is being enforced. If the amount of processing is not in line with defined job priority levels, the system may increase or decrease the rate at which data samples from that particular job is provided to the system.

Additional Considerations.

The preceding sections have described several different scheduling scenarios and how those scenarios are handled. The techniques described in each of those scenarios can be combined to create complex solutions to difficult scheduling problems.

Furthermore, the operation of the system may be continually monitored such that if the desired outcome is not achieved, then various parameters may be adjusted. For example, the rate at which data samples are provided may be adjusted or the number of active queues may be increased or decreased.

The operating environment may become quite complex. Supporting various jobs at scale requires ability to swap jobs in and out in the background. This also involves sharing buffers and bandwidth between the jobs and having tiers of jobs.

Parallel training may occur wherein the same artificial neural network model is replicated and multiple training sets are run in parallel. After parallel training the gradient updates from the parallel models need to be merged together to create single model from the parallel models. Thus, this requires merging various weights over parameter servers and broadcasting them back. This can be done in background if the weight updates are scheduled properly.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim is still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure.

The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A method of scheduling computational matrix operations for execution, the method comprising:
    selecting a data sample batch for a particular neural network model;
    creating a set of work queues for the data sample batch;
    determining a number of active queues within the set of work queues to be allowed to be processed simultaneously;
    setting a priority level for each computational matrix operation in the set of work queues;
    determining if preemption will be allowed during the execution, the preemption allowing a first computational matrix operation to be paused for a second computational matrix operation in the set of work queues; and
    executing a computational matrix operation on the data sample batch in the set of work queues.

2. The method of claim 1, the method further comprising: the computational matrix operation in the set of work queues being a forward pass operation.

3. The method of claim 1, the method further comprising: the computational matrix operation in the set of work queues being a back propagation operation.

4. The method of claim 1, the method further comprising: the computational matrix operation in the set of work queues being a loss operation.

5. The method of claim 1, the method further comprising: the computational matrix operation in the set of work queues being a gradient update operation.

6. The method of claim 1, the method further comprising: the computational matrix operation in the set of work queues being a recompute operation.

7. A system for scheduling computational matrix operations for execution, the system comprising:
    a hardware dynamic scheduler further comprising a set of scheduling work queues, each scheduling work queue comprising an ordered set of computational matrix operations for processing a selected data sample batch for a particular neural network model, and the hardware dynamic scheduler configured to determine a number of allowed active queues within the set of scheduling work queues to select a next executable computational matrix operation from an allowed active queue based on scheduling policies; and
    bus wiring and combination logic between individual matrix processors in a plurality of matrix processors in a grid array format, the bus wiring and combination logic coupling all of the plurality of matrix processors to buffers that provide input data and vector processing units that receive and process computational matrix operation results.

8. The system of claim 7 for scheduling computational matrix operations further configured to:
process the selected data sample batch comprising a plurality data samples with a computational matrix operation from within the allowed active queues for training artificial neural network weights for the particular neural network model.

9. The system of claim 7 for scheduling computational matrix operations further configured to:
create an ordered set of scheduling work queues based on a size of the data sample batch to be processed.

10. The system of claim 7 for scheduling computational matrix operations further configured to:
perform different stages of artificial neural network training operations including forward pass, backward pass, gradient computations and weight updates, wherein the different stages comprise computational matrix operations and wherein the hardware dynamic scheduler is further configured to schedule the different stages of the artificial neural network training operations.

11. The system of claim 7 for scheduling computational matrix operations, the system further configured to:
enable pre-emption wherein the hardware dynamic scheduler is further configured to enable the pre-emption for scheduling the computational matrix operations.

12. The system of claim 7 for scheduling computational matrix operations further configured to:
allow higher priority work to context switch from lower priority work, wherein the hardware dynamic scheduler is further configured to enable pre-emption by allowing higher priority work to context switch from lower priority work for scheduling the computational matrix operations.

13. The system of claim 7 for scheduling computational matrix operations, the system further configured to:
minimize latency by scheduling the computational matrix operations based on the scheduling policies.

14. The system of claim 7 for scheduling computational matrix operations further configured to:
process with maximum throughput by scheduling the computational matrix operations based on the scheduling policies.

15. The system of claim 7 for scheduling computational matrix operations, the hardware dynamic scheduler further configured to dynamically handle memory management for scheduling the computational matrix operations.

16. The system of claim 7 for scheduling computational matrix operations, the hardware dynamic scheduler further configured to dynamically handle memory management by ensuring each job has needed memory resources for scheduling the computational matrix operations.

17. The system of claim 7 for scheduling computational matrix operations, the hardware dynamic scheduler further configured to ensure there are no memory overflows for scheduling the computational matrix operations.

18. The system of claim 7 for scheduling computational matrix operations, the hardware dynamic scheduler further configured to handle work priority for scheduling the computational matrix operations.

19. The system of claim 7 for scheduling computational matrix operations, the hardware dynamic scheduler further configured to handle synchronization for scheduling the computational matrix operations.

20. The system of claim 7 for scheduling computational matrix operations, the hardware dynamic scheduler further configured to resolve data dependencies for scheduling the computational matrix operations.

* * * * *

UNITED STATES PATENT AND TRADEMARK OFFICE
CERTIFICATE OF CORRECTION

PATENT NO. : 12,229,589 B2
APPLICATION NO. : 16/869520
DATED : February 18, 2025
INVENTOR(S) : Shang-Tse Chuang, Sharad Vasantrao Chole and Siyad Chih-Hua Ma Page 1 of 1

It is certified that error appears in the above-identified patent and that said Letters Patent is hereby corrected as shown below:

On the Title Page

Item (72) Inventors reads:
"Shang-Tse Chuang, Lost Altos, CA (US); Sharad Vasantrao Chole, San Jose, CA (US); Siyad Chih-Hua Ma, Palo Alto, CA (US)"

Should read:
"Shang-Tse Chuang, Los Altos, CA (US); Sharad Vasantrao Chole, San Jose, CA (US); Siyad Chih-Hua Ma, Palo Alto, CA (US)"

Signed and Sealed this
Twenty-fourth Day of June, 2025

Coke Morgan Stewart
*Acting Director of the United States Patent and Trademark Office*